United States Patent
Tercero Vargas et al.

(10) Patent No.: US 10,439,743 B2
(45) Date of Patent: Oct. 8, 2019

(54) SYSTEM, METHOD AND APPARATUS FOR MANAGING CO-CHANNEL INTERFERENCE

(71) Applicant: Telefonaktiebolaget LM Ericsson (publ), Stockholm (SE)

(72) Inventors: Miurel Isabel Tercero Vargas, Sollentuna (SE); Jonas Hansryd, Gothenburg (SE); Jörgen Karlsson, Sundbyberg (SE); Muhammad Kazmi, Bromma (SE); Jonas Kronander, Knivsta (SE); Sachin Sharma, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/068,494

(22) PCT Filed: Jan. 12, 2016

(86) PCT No.: PCT/EP2016/050445
§ 371 (c)(1),
(2) Date: Jul. 6, 2018

(87) PCT Pub. No.: WO2017/121460
PCT Pub. Date: Jul. 20, 2017

(65) Prior Publication Data
US 2019/0013883 A1    Jan. 10, 2019

(51) Int. Cl.
*H04B 17/345*     (2015.01)
*H04B 7/0413*     (2017.01)
(Continued)

(52) U.S. Cl.
CPC ......... *H04B 17/345* (2015.01); *H04B 7/0413* (2013.01); *H04B 7/0617* (2013.01); *H04B 17/336* (2015.01); *H04W 72/085* (2013.01)

(58) Field of Classification Search
CPC combination set(s) only.
See application file for complete search history.

(56) References Cited

U.S. PATENT DOCUMENTS 8,185,060 B2 * 5/2012 Agashe ................. H04W 48/20
                                                                        455/69
8,195,097 B2 * 6/2012 Ji ........................ H04W 52/247
                                                                        370/318
(Continued)

OTHER PUBLICATIONS

European Communications Office, "The European Table of Frequency Allocations and Applications in the Frequency Range of 8.3 kHz to 3000 GHz (ECA Table)", ERC Report 25, Electronic Communications Committee (ECC) within the European Conference of Postal and Telecommunications Administrations(CEPT), approved May 2015, pp. 1-262.

(Continued)

*Primary Examiner* — Linda Wong
(74) *Attorney, Agent, or Firm* — Sage Patent Group

(57) ABSTRACT

A system, method, and apparatus for managing interference are presented. The interference may be between i) a fixed wireless link, FL, formed by a first FL node and a second FL node which communicate at a frequency $f_1$ and ii) a radio access network, RAN, node. The method may comprise the first FL node monitoring radio link quality, $Q_L$, of fixed wireless link signals at $f_1$. The first FL node may determine whether $Q_L$ is worse than a predetermined $Q_L$ threshold. If $Q_L$ is worse than the predetermined $Q_L$ threshold, the first FL node may measure, during a silent period, how much one or more signals transmitted from the RAN node 108 interferes with the first FL node at the $f_1$. The first FL node may transmit, to an interference mitigation controller, interference measurement information which indicates how much the RAN node interferes with the first FL node at $f_1$.

20 Claims, 18 Drawing Sheets

(51) Int. Cl.
*H04B 7/06* (2006.01)
*H04B 17/336* (2015.01)
*H04W 72/08* (2009.01)

(56) References Cited

U.S. PATENT DOCUMENTS

| | | | | |
|---|---|---|---|---|
| 9,008,213 B2 * | 4/2015 | Han | H04B 7/024 | 375/267 |
| 9,332,452 B2 * | 5/2016 | Gutierrez | H04W 24/10 | |
| 2002/0028675 A1 * | 3/2002 | Schmutz | H04B 7/2606 | 455/424 |
| 2004/0178853 A1 * | 9/2004 | Barak | H03F 1/301 | 330/302 |
| 2006/0083186 A1 * | 4/2006 | Handforth | H04W 88/085 | 370/310 |
| 2009/0286563 A1 * | 11/2009 | Ji | H04W 48/20 | 455/501 |
| 2011/0060956 A1 * | 3/2011 | Goldsmith | H04B 7/024 | 714/746 |
| 2011/0149769 A1 | 6/2011 | Nagaraja | | |
| 2011/0244790 A1 * | 10/2011 | Kwak | H04B 7/15564 | 455/24 |
| 2012/0033573 A1 * | 2/2012 | Stanwood | H04W 28/24 | 370/252 |
| 2012/0040701 A1 * | 2/2012 | Tong | H04W 52/243 | 455/501 |
| 2012/0063383 A1 * | 3/2012 | Barbieri | H04W 72/082 | 370/315 |
| 2012/0082058 A1 * | 4/2012 | Gerstenberger | H04W 36/00837 | 370/252 |
| 2012/0083282 A1 * | 4/2012 | Choi | H04B 7/022 | 455/449 |
| 2012/0115497 A1 * | 5/2012 | Tolli | H04B 7/022 | 455/452.2 |
| 2012/0250526 A1 | 10/2012 | Zhao et al. | | |
| 2013/0012224 A1 * | 1/2013 | Yang | H04W 16/10 | 455/452.1 |
| 2013/0044721 A1 * | 2/2013 | Yang | H04L 5/0053 | 370/329 |
| 2013/0114430 A1 * | 5/2013 | Koivisto | H04B 7/024 | 370/252 |
| 2013/0115985 A1 * | 5/2013 | Davydov | H04B 7/024 | 455/501 |
| 2013/0115999 A1 * | 5/2013 | Sirotkin | H04B 7/0617 | 455/522 |
| 2013/0142136 A1 * | 6/2013 | Pi | H04W 28/0289 | 370/329 |
| 2013/0176887 A1 * | 7/2013 | Seo | H04B 7/024 | 370/252 |
| 2013/0176934 A1 * | 7/2013 | Malladi | H04W 56/001 | 370/315 |
| 2013/0188751 A1 * | 7/2013 | Ohlmer | H04B 7/0417 | 375/296 |
| 2013/0201902 A1 * | 8/2013 | Nagata | H04W 72/04 | 370/315 |
| 2013/0223251 A1 * | 8/2013 | Li | H04W 72/046 | 370/252 |
| 2013/0229307 A1 * | 9/2013 | Chang | H01Q 1/246 | 342/372 |
| 2013/0242771 A1 | 9/2013 | Tanaka et al. | | |
| 2013/0279364 A1 * | 10/2013 | Nagata | H04B 7/155 | 370/252 |
| 2013/0279403 A1 * | 10/2013 | Takaoka | H04L 5/0035 | 370/328 |
| 2013/0324050 A1 * | 12/2013 | Gutierrez | H04W 24/10 | 455/67.11 |
| 2013/0329545 A1 * | 12/2013 | Wu | H04L 1/0025 | 370/216 |
| 2014/0185497 A1 * | 7/2014 | Wolf | H04W 28/26 | 370/294 |
| 2015/0031284 A1 * | 1/2015 | Pitakdumrongkija | H04W 16/26 | 455/9 |
| 2015/0049621 A1 * | 2/2015 | Liu | H04L 5/0048 | 370/252 |
| 2015/0124685 A1 | 5/2015 | Dahlman et al. | | |
| 2015/0318966 A1 * | 11/2015 | Liu | H04W 28/16 | 370/329 |
| 2015/0382371 A1 * | 12/2015 | Liu | H04B 7/024 | 370/329 |
| 2018/0139628 A1 * | 5/2018 | Choi | H04W 16/28 | |
| 2018/0317097 A1 * | 11/2018 | Senior | H04W 16/26 | |

OTHER PUBLICATIONS

FCC, "3.5 GHz Band / Citizens Broadband Radio Service", Available online at www.fcc.gov/print/node/66383, downloaded Oct. 13, 2015, 4 pages.

* cited by examiner

SYSTEM, METHOD AND APPARATUS FOR MANAGING CO-CHANNEL INTERFERENCE

TECHNICAL FIELD

This disclosure relates to a system, method, and apparatus for managing co-channel interference (e.g., co-channel interference between a radio access network and a fixed wireless link).

BACKGROUND

In wireless communications, different wireless services may co-exist at the same time in the same area. For a wireless cellular communication service, for example, a radio access network (RAN) node (e.g., an eNB or NB) may provide a radio access point for multiple mobile devices. The RAN node may sometimes be referred to as a mobile network node. This radio access service may co-exist with a wireless backhaul service provided by a fixed wireless link. The wireless backhaul service may provide a data link between the RAN node and a receiver at another location, such as a receiver of a relay device that can relay signals between the RAN node and a core network. This fixed wireless data link may be an inexpensive way to establish point-to-point communication between two locations because it may eliminate or reduce the need to lay wiring between the two locations.

Radio access services and wireless backhaul services currently do not occupy the same frequency bands. A radio access service such as LTE cellular service, for example, generally occupies frequency bands below 6 GHz (e.g., 1.85-1.91 GHz to provide cellular coverage), while wireless backhaul service typically operate in frequency bands above 6 GHz. The spectrum above 6 GHz may, however, be shared by a number of services. Those services include fixed wireless link services (e.g., wireless backhaul), radio astronomy, space research, and automotive radar.

Another example of co-existing wireless services includes co-existing services in unlicensed bands (e.g., a frequency band around 2.4 GHz or 5.8 GHz). Those services may sometimes be deployed in a co-channel scenario in which they share the same or overlapping frequency bands. In another example, multiple Citizens Broadband Radio Services may share the 3.5-3.65 GHz band. In these co-channel deployment examples, interference is typically managed with a listen-before-talk (LBT) scheme, or by limiting the devices' transmit power.

SUMMARY

The present disclosure relates to managing interference between different wireless services in a co-channel deployment scenario, such as between a radio access service and a fixed wireless link service sharing a communication frequency (e.g., between two services that use overlapping frequency bands).

Co-existence between radio access and other wireless services will be increasingly important to facilitate the introduction of 5G services, in order for 5G to get access to wide bandwidths and for national regulators to make sure that the available spectrum is used in the most efficient way. Co-existing wireless technologies may have different regulatory requirements in terms of, e.g., bandwidth, power, interference, and antenna performance. They should be deployed such that technologies delivering high priority services are not interfered by technologies delivering lower priority services. At the same time, these services should have an acceptable performance.

Although cellular service and wireless backhaul service currently do not overlap in frequency, 5G or future systems may use co-channel deployment of those services. For instance, a future radio access service may be deployed at a channel frequency, above 6 GHz, also being used by a fixed wireless link service. Future cellular or other radio access services deployed above 6 GHz may be required to use beamforming in order to compensate for path losses due to propagation characteristics at higher frequencies. Such highly directive beams, if not managed adequately, could cause severe interference in a fixed wireless link service that is using the same channel frequency. Although interference can be addressed through a listen-before-talk (LBT) scheme or by limiting transmission power in one or both services, these solutions can increase latency, reduce throughput, and/or shrink coverage.

Generally speaking, the present disclosure relates to managing interference in a co-channel deployment scenario, such as managing interference experienced by a first service that is co-deployed with at least a second service. In this scenario, the first service may monitor radio link quality of signals for its service. It may perform interference measurement and initiate interference mitigation, but only if the radio link quality deteriorates past a threshold. If the radio link quality deteriorates past the threshold, interference measurement may be performed to determine whether interference can be attributed to another service, such as the second service. The interference measurement may be performed in a silent period in which the first service ceases wireless communication, so that the measurement can isolate the effect of wireless communication in, e.g., the second service. The interference measurement may be performed to determine whether the second service is primarily responsible for interference that is causing radio link quality to deteriorate. The service performing the measurement may report results of the interference measurement to a controller that is configured to manage interference mitigation based on the results. Interference mitigation can target the second service, but only if the interference measurement determined the second service to be responsible for the interference that is deteriorating the radio link quality past the threshold. The controller which determines the interference mitigation scheme may be part of the first service, part of the second service, or part of a different service, such as a centralized interference mitigation service in the core network, the cloud, or elsewhere. In one instance, the two services can establish a time division or frequency division scheme to reduce interference with each other. In situations in which the second wireless service uses beamforming, the interference measurement may determine how much interference is associated with each of various beamforming configurations. The interference mitigation may restrict the use of beamforming configurations that were measured to cause sufficiently severe interference. If the interference measurement determined that the second wireless service is not primarily responsible for the interference, the first service may instead locate other co-deployed services and perform interference measurement on those services.

In one aspect of the present disclosure, one wireless service is a fixed wireless link (FL) service, and another wireless service co-deployed on the same channel is a radio access service provided by a radio access network (RAN) node. The principles discussed herein may be applied, however, to any two wireless services that are co-deployed and share a common carrier frequency.

One aspect of the present disclosure presents a method for managing interference between i) a fixed wireless link (FL) formed by at least a first FL node and a second FL node which are configured to communicate wirelessly with each other at a first frequency and ii) a radio access network (RAN) node serving wireless communication devices (WCDs). The method comprises a) the first FL node monitoring radio link quality ($Q_L$) of fixed wireless link signals received by the first FL node at the first frequency; b) the first FL node determining whether $Q_L$ is worse than a predetermined radio link quality threshold; in response to determining that $Q_L$ is worse than the predetermined radio link quality threshold: c) the first FL node measuring, during a silent period in which the second FL node is not transmitting any signal to the first FL node at the first frequency, how much one or more signals transmitted from the RAN node interferes with the first FL node at the first frequency; and d) the first FL node providing interference measurement information to a controller configured to manage interference mitigation. The interference measurement information indicates how much the one or more signals from the RAN node interferes with the first FL node at the first frequency, and the controller is configured to manage interference mitigation between the fixed wireless link and the RAN node based on the interference measurement information.

In some implementations, the RAN node is able to use different beamforming configurations in transmitting different signals, and the RAN node is communicatively coupled to the first FL node through a communication channel. The method further comprises: in response to the first FL node determining that the monitored radio link quality is worse than the predetermined threshold, the first FL node transmitting, to the RAN node over the communication channel, a request for the RAN node to transmit one or more signals in the silent period, wherein the request identifies which one or more beamforming configurations the RAN node should use in transmitting the one or more signals. The one or more signals from the RAN node in step c) uses the one or more beamforming configurations identified in the request.

In some implementations, the different beamforming configurations correspond to at least one of: i) different beam directions, ii) different beam widths, and iii) different output powers at the RAN node.

In some implementations, step c) comprises the first FL node measuring, during the silent period, each signal in a group of one or more signals from the RAN node corresponding to a group of one or more beamforming configurations which the RAN node is able to use in transmitting signals.

In some implementations, the group of one or more beamforming configurations includes all beam directions in which the RAN node is capable of transmitting.

In some implementations, the group of one or more beamforming configurations includes only a subset of all beam directions in which the RAN node is capable of transmitting. The method further comprises the first FL node measuring, during a subsequent silent period, another group of one or more signals corresponding to a different subset of the beam directions in which the RAN node is capable of transmitting.

In some implementations, the RAN node is able to use different beamforming configurations in transmitting different signals. The method further comprises the first FL node receiving, from the RAN node, information on which one or more beamforming configurations the RAN node used to transmit the one or more signals in step c).

In some implementations, the interference measurement information transmitted to the RAN node includes at least one of: i) information about signal power detected at the first FL node during the silent period, and ii) an estimated total interference level, $I_{ToT}$.

In some implementations, the method further comprises: the first FL node collecting statistics on channel noise during a time period before the RAN node begins transmitting any signal for WCDs; determining a baseline level of channel noise based on the collected statistics on channel noise, wherein the estimated total interference level, $I_{ToT}$, is indicated by a difference between a maximum signal power detected at the first FL node during the silent period and the baseline level of channel noise.

In some implementations, the method further comprises the controller that is configured to manage interference mitigation determining, based on the interference measurement information, whether an estimated total interference level, $I_{ToT}$, is worse than a predetermined threshold interference level, $I_{thr}$; in response to determining that $I_{ToT}$ is worse than $I_{thr}$, the controller determining a resource partitioning scheme that includes at least one of: i) a time partitioning scheme in which the fixed wireless link and the RAN node use non-overlapping time slots to transmit signals at the first frequency, ii) a frequency partitioning scheme in which the fixed wireless link and the RAN node use different frequencies to transmit signals during overlapping transmission periods, iii) a combination of the time partitioning scheme and the frequency partitioning scheme. The controller informs at least one of the first FL node, the second FL node, and the RAN node of the resource partitioning scheme.

In some implementations, the method further comprises: the controller that is configured to manage interference mitigation determining, based on the interference measurement information, whether an estimated total interference level, $I_{ToT}$, is worse than a predetermined threshold interference level, $I_{thr}$; in response to determining that $I_{ToT}$ is worse than $I_{thr}$, the controller determining a change in transmission configuration for transmitting to WCDs, the change including at least one of: i) another RAN node replacing the RAN node in transmitting signals to the wireless communication device; ii) the RAN node using a different beamforming configuration than one which was determined to make $I_{ToT}$ worse than $I_{thr}$; iii) the RAN node using a different frequency than the first frequency for future signal transmissions to a WCD; and iv) the RAN node reducing an output power used to transmit signals to the WCD. The controller informs at least one of the RAN node and the other RAN node of the change in the transmission configuration.

In some implementations, the controller is located in the first FL node.

In some implementations, the controller is located in the RAN node, and wherein the interference measurement information is provided to the controller via transmission over a communication channel communicatively coupling the first FL node and the RAN node.

In some implementations, the method further comprises: the first FL node determining, based on the interference measurement information, whether an estimated total interference level, $I_{ToT}$, caused by the RAN node is worse than a predetermined threshold interference level, $I_{thr}$; in response to determining that $I_{ToT}$ is not worse than $I_{thr}$, the first FL node measuring how much one or more signals transmitted from another RAN node interferes with the first FL node at the first frequency. The RAN node is the closest RAN node to the first FL node and the other RAN node is the second closest RAN node to the first FL node.

In some implementations, monitoring the radio link quality in step a) comprises monitoring at least one of: i) signal to noise ratio, SNR, or signal to interference and noise ratio, SINR, or signals from the second FL node; ii) bit error rate, BER, or block error rate, BLER, of signals from the second FL node; and iii) transport format of signals from the second FL node.

In some implementations, the silent period is created by at least one of: i) mutual coordination between the first FL node and the second FL node, and ii) mutual coordination between the first FL node and the RAN node.

One aspect of the present disclosure presents a method for managing interference between i) a fixed wireless link (FL) formed by at least a first FL node and a second FL node which are configured to communicate wirelessly with each other at a first frequency and ii) a radio access network (RAN) node serving wireless communication devices (WCDs) and communicatively coupled to at least the first FL node through a communication channel. The method comprises: a) the RAN node transmitting one or more signals during a silent period in which the second FL node is not transmitting any signal to the first FL node at the first frequency; b) the RAN node receiving from the first FL node over the communication channel, at a controller located in the RAN node for managing interference mitigation, interference measurement information that indicates how much the one or more signals from the RAN node interferes with the first FL node at the first frequency; c) the RAN node using the controller to determine, based on the interference measurement information, whether an estimated total interference level, $I_{ToT}$, is worse than a predetermined threshold interference level, $I_{thr}$; and d) in response to determining that $I_{ToT}$ is worse than $I_{thr}$, the RAN node using the controller to mitigate interference experienced by the first FL node at the first frequency.

In some implementations, the RAN node is able to use different beamforming configurations in transmitting different signals. The method further comprises: the RAN node receiving, from the first FL node over the communication channel, a request to transmit one or more signals during the silent period, wherein the request identifies which one or more beamforming configurations the RAN node should use in transmitting the one or more signals, wherein the one or more signals in step a) are transmitted using the one or more beamforming configurations identified in the request.

In some implementations, step d) comprises the controller (130b) that is configured to manage interference mitigation determining a resource partitioning scheme that includes at least one of: i) a time partitioning scheme in which the fixed wireless link and the RAN node use non-overlapping time slots to transmit signals at the first frequency, ii) a frequency partitioning scheme in which the fixed wireless link and the RAN node use different frequencies to transmit signals during overlapping transmission periods, iii) a combination of the time partitioning scheme and the frequency partitioning scheme. The controller informs at least one of the first FL node, the second FL node, and the RAN node of the resource partitioning scheme.

In some implementations, step d) comprises the controller determining a change in transmission configuration that includes at least one of: i) another RAN node replacing the RAN node in transmitting signals to a WCD (118); ii) the RAN node using a different beamforming configuration than one which was determined to make $I_{ToT}$ worse than $I_{thr}$; iii) the RAN node using a different frequency than the first frequency for future signal transmissions to the WCD (118); and iv) the RAN node reducing an output power at the RAN node used to transmit signals to the WCD (118). The controller informs at least one of the RAN node and the other RAN node of the change in the transmission configuration.

In some implementations, step a) comprises at least one of: i) the RAN node transmitting, during the silent period, a group of signals that correspond to all beam directions in which the RAN node is capable of transmitting; ii) the RAN node transmitting, during the silent period, a group of one or more signals that correspond to only a subset of all beam directions in which the RAN node is capable of transmitting. The method further comprises the RAN node transmitting, during a subsequent silent period, another group of one or more signals that correspond to a different subset of beam directions in which the RAN node is capable of transmitting.

In some implementations, the method further comprises the RAN node collecting statistics on channel noise during a time period before the RAN node begins transmitting any signal for WCDs; the RAN node determining a baseline level of channel noise based on the collected statistics on channel noise. The estimated total interference level, $I_{ToT}$, is indicated by a difference between a maximum signal power received at the first FL node during the silent period and the baseline level of channel noise.

In some implementations, the method further comprises the RAN node transmitting, before the RAN node begins performing any communication with any WCD to be served by the RAN node, different signals using different beam directions; requesting, from the first FL node, interference measurement information corresponding to the different beam directions; determining, based on this interference measurement information, whether any of the beam directions interferes with the fixed wireless link at the first frequency by more than a threshold amount; and refraining from transmitting any signal to any of the WCDs in a beam direction determined to interfere with the fixed wireless link at the first frequency by more than the threshold amount.

One aspect of this disclosure presents a fixed wireless link (FL) node that comprises one or more transceivers and a controller. The one or more transceivers are configured to communicate wirelessly with a second FL node using at least a first frequency so as to form a fixed wireless link (102). The controller 130a comprises one or more processors configured to: a) monitor radio link quality of signals of the fixed wireless link received by the one or more transceivers at the first frequency; b) determine whether the monitored radio link quality is worse than a predetermined radio link quality threshold; in response to determining that the monitored radio link quality is worse than the predetermined radio link quality threshold: c) measure, during a silent period in which the second FL node is not transmitting any signal to the first FL node at the first frequency, how much one or more signals transmitted from a radio access network (RAN) node interferes with the first FL node at the first frequency, wherein the RAN node is serving one or more wireless communication devices, WCDs; and d) provide interference measurement information to a controller configured to manage interference mitigation. The interference measurement information indicates how much the one or more signals from the RAN node interferes with the first FL node at the first frequency, and the controller is configured to manage interference mitigation between the fixed wireless link and the RAN node based on the interference measurement information.

In some implementations, the FL node further comprises a communication interface configured to communicate, through a communication channel, with the radio access network (RAN) node. The RAN node is able to use different beamforming configurations in transmitting different signals. The one or more processors are further configured to: in response to the first FL node determining that the monitored radio link quality is worse than the predetermined threshold: transmit, to the RAN node over the communication channel, a request for the RAN node to transmit one or more signals in the silent period. The request identifies which one or more beamforming configurations the RAN node should use in transmitting the one or more signals. The one or more signals from the RAN node uses the one or more beamforming configurations identified in the request.

In some implementations, the different beamforming configurations correspond to at least one of: i) different beam directions, ii) different beam widths, and iii) different output powers at the RAN node.

In some implementations, the one or more processors are configured to perform the measurement by causing the first FL node to measure, during the silent period, each signal in a group of one or more signals from the RAN node corresponding to a group of one or more beamforming configurations which the RAN node is able to use in transmitting signals.

In some implementations, the group of one or more beamforming configurations includes all beam directions in which the RAN node is capable of transmitting.

In some implementations, the group of one or more beamforming configurations includes only a subset of all beam directions in which the RAN node is capable of transmitting. The one or more processors are further configured to cause the first FL node to measure, during a subsequent silent period, another group of one or more signals corresponding to a different subset of the beam directions in which the RAN node is capable of transmitting.

In some implementations, the RAN node is able to use different beamforming configurations in transmitting different signals. The one or more processors are further configured to receive, from the RAN node, information on which one or more beamforming configurations the RAN node used to transmit the one or more signals.

In some implementations, the interference measurement information transmitted to the RAN node includes at least one of: i) information about signal power detected at the first FL node during the silent period, and ii) an estimated total interference level, $I_{ToT}$.

In some implementations, the one or more processors are further configured to: cause the first FL node to collect statistics on channel noise during a time period before the RAN node begins transmitting any signal for WCDs; determine a baseline level of channel noise based on the collected statistics on channel noise, wherein the estimated total interference level, $I_{ToT}$, is indicated by a difference between a maximum signal power detected at the first FL node during the silent period and the baseline level of channel noise.

In some implementations, the one or more processors of the controller are further configured to manage interference mitigation by: determining, based on the interference measurement information, whether an estimated total interference level, $I_{ToT}$, is worse than a predetermined threshold interference level, $I_{thr}$; in response to determining that $I_{ToT}$ is worse than $I_{thr}$, the controller determining a resource partitioning scheme that includes at least one of: i) a time partitioning scheme in which the fixed wireless link and the RAN node use non-overlapping time slots to transmit signals at the first frequency, ii) a frequency partitioning scheme in which the fixed wireless link and the RAN node use different frequencies to transmit signals during overlapping transmission periods, iii) a combination of the time partitioning scheme and the frequency partitioning scheme; and informing at least one of the first FL node, the second FL node, and the RAN node of the resource partitioning scheme.

In some implementations, the one or more processors of the controller are configured to manage interference mitigation by: determining, based on the interference measurement information, whether an estimated total interference level, $I_{ToT}$, is worse than a predetermined threshold interference level, $I_{thr}$; in response to determining that $I_{ToT}$ is worse than $I_{thr}$, the controller determining a change in transmission configuration for transmitting to WCDs, the change including at least one of: i) another RAN node replacing the RAN node in transmitting signals to the wireless communication device; ii) the RAN node using a different beamforming configuration than one which was determined to make $I_{ToT}$ worse than $I_{thr}$; iii) the RAN node using a different frequency than the first frequency for future signal transmissions to a WCD; and iv) the RAN node reducing an output power used to transmit signals to the WCD; and informing at least one of the RAN node and the other RAN node of the change in the transmission configuration.

In some implementations, the one or more processors are further configured to: determine, based on the interference measurement information, whether an estimated total interference level, $I_{ToT}$, caused by the RAN node is worse than a predetermined threshold interference level, $I_{thr}$; in response to determining that $I_{ToT}$ is not worse than $I_{thr}$, cause the the first FL node to measure how much one or more signals transmitted from another RAN node interferes with the first FL node at the first frequency. The RAN node is the closest RAN node to the first FL node and the other RAN node is the second closest RAN node to the first FL node.

In some implementations, the one or more processors are configured to: monitor the radio link quality by monitoring at least one of: i) signal to noise ratio, SNR, or signal to interference and noise ratio, SINR, or signals from the second FL node; ii) bit error rate, BER, or block error rate, BLER, of signals from the second FL node; and iii) transport format of signals from the second FL node.

One aspect of this disclosure presents a radio access network (RAN) node. The RAN node comprises one or more transceivers, a communication interface, and a controller. The one or more transceivers are configured to communicate wirelessly with wireless communication devices, WCDs. The communication interface is configured to communicate, through a communication channel, with a first fixed wireless link (FL) node that forms a fixed wireless link with a second FL node. The controller comprises one or more processors configured to: a) transmit one or more signals through the one or more transceivers during a silent period in which the second FL node is not transmitting any signal to the first FL node at the first frequency; b) receive, from the first FL node through the communication interface, interference measurement information that indicates how much the one or more signals from the RAN node interferes with the first FL node at the first frequency; c) determine, based on the interference measurement information, whether an estimated total interference level, $I_{ToT}$, is worse than a predetermined threshold interference level, $I_{thr}$; and d) in response to determining that $I_{ToT}$ is worse than $I_{thr}$, mitigate interference experienced by the first FL node at the first frequency.

In some implementations, the one or more transceivers are able to use different beamforming configurations in transmitting different signals. The one or more processors are further configured to: receive, from the first FL node through the communication interface, a request to transmit one or more signals during the silent period. The request identifies which one or more beamforming configurations the RAN node should use in transmitting the one or more signals, wherein the one or more signals are transmitted by the one or more transceivers using the one or more beamforming configurations identified in the request.

In some implementations, the one or more processors of the controller are configured to mitigate interference by: determining a resource partitioning scheme that includes at least one of: i) a time partitioning scheme in which the fixed wireless link and the RAN node use non-overlapping time slots to transmit signals at the first frequency, ii) a frequency partitioning scheme in which the fixed wireless link and the RAN node use different frequencies to transmit signals during overlapping transmission periods, iii) a combination of the time partitioning scheme and the frequency partitioning scheme. The one or more processors inform at least one of the first FL node, the second FL node, and the RAN node of the resource partitioning scheme.

In some implementations, the one or more processors of the controller are configured to mitigate interference by: determining a change in transmission configuration that includes at least one of: i) another RAN node replacing the RAN node in transmitting signals to a WCD; ii) the RAN node using a different beamforming configuration than one which was determined to make $I_{ToT}$ worse than $I_{thr}$; iii) the RAN node using a different frequency than the first frequency for future signal transmissions to the WCD; and iv) the RAN node reducing an output power at the RAN node used to transmit signals to the WCD. The one or more processors inform at least one of the RAN node and the other RAN node of the change in the transmission configuration.

In some implementations, the one or more processors are further configured to transmit the one or more signals by causing the one or more transceivers to perform at least one of the following: i) transmit, during the silent period, a group of signals that correspond to all beam directions in which the RAN node is capable of transmitting; ii) transmit, during the silent period, a group of one or more signals that correspond to only a subset of all beam directions in which the RAN node is capable of transmitting, and to transmit, during a subsequent silent period, another group of one or more signals that correspond to a different subset of beam directions in which the RAN node is capable of transmitting.

In some implementations, the one or more processors are further configured to: collect statistics on channel noise during a time period before the RAN node begins transmitting any signal for WCDs; determine a baseline level of channel noise based on the collected statistics on channel noise. The estimated total interference level, $I_{ToT}$, is indicated by a difference between a maximum signal power received at the first FL node during the silent period and the baseline level of channel noise.

In some implementations, the one or more processors are further configured to: cause the RAN node to transmit, before the RAN node begins performing any communication with any WCD to be served by the RAN node, different signals using different beam directions; request, from the first FL node through the communication interface, interference measurement information corresponding to the different beam directions; determine, based on this interference measurement information, whether any of the beam directions interferes with the fixed wireless link at the first frequency by more than a threshold amount; and cause the one or more transceivers to refrain from transmitting any signal to any of the WCDs in a beam direction determined to interfere with the fixed wireless link at the first frequency by more than the threshold amount.

One aspect of this disclosure presents a method for managing interference between i) a fixed wireless link (FL) formed by a first FL node and a second FL node which are configured to communicate wirelessly with each other at a first frequency and ii) a radio access network (RAN) node serving one or more wireless communication devices, WCDs. The method comprises: a) the RAN node monitoring radio link quality of signals received from a WCD at the first frequency; b) the RAN node determining whether the monitored radio link quality is worse than a predetermined radio link quality threshold; in response to the RAN node determining that the monitored radio link quality is worse than the predetermined radio link quality threshold: c) the RAN node measuring, during a silent period in which no WCD being served by RAN node is transmitting any signal to the RAN node at the first frequency, how much one or more signals transmitted by the first FL node or the second FL node interferes with the RAN node at the first frequency; and d) the RAN node providing interference measurement information to a controller configured to manage interference mitigation. The interference measurement information indicates how much the one or more signals from the first FL node or second FL node interferes with the RAN node at the first frequency, and the controller is configured to manage interference mitigation between the first FL node or second FL node and the RAN node based on the interference measurement information.

In some implementations, the RAN node is communicatively coupled to at least the first FL node through a communication channel, and step d) comprises providing the interference measurement information through the communication channel to a controller located in the first FL node.

One aspect of this disclosure presents a method for managing interference between i) a fixed wireless link (FL) formed by a first FL node and a second FL node which are configured to communicate wirelessly with each other at a first frequency and ii) a radio access network (RAN) node serving wireless communication devices (WCDs) and communicatively coupled to at least the first FL node through a communication channel. The method comprises a) the first FL node receiving, from the RAN node over the communication channel, a request for the first FL node to transmit one or more signals during a silent period in which no WCD being served by the RAN node is transmitting any signal to the RAN node at the first frequency, or a request for the second FL node to transmit one or more signals during the silent period; b) the first FL node performing at least one of: i) transmitting, during the silent period, the one or more signals and ii) relaying the request to the second FL node; c) the first FL node receiving, from the RAN node over the communication channel, at a controller located in the first FL node for managing interference mitigation, interference measurement information that indicates how much the one or more signals from the first FL node interferes with the RAN node at the first frequency or how much the one or more signals from the second FL node interferes with the RAN node at the first frequency; d) the first FL node using the controller to determine, based on the interference measurement information, whether an estimated total interference level, $I_{ToT}$, is worse than a predetermined threshold interference level, $I_{thr}$; and e) in response to determining that $I_{ToT}$ is worse than $I_{thr}$, the first FL node using the controller to mitigate interference experienced by the first FL node at the first frequency.

One aspect of this disclosure presents a radio access network (RAN) node that comprises one or more transceivers and a controller. The one or more transceivers are configured to communicate wirelessly with a wireless communication device, WCD. The controller comprises one or more processors configured to: a) monitor radio link quality of signals received from the WCD at the first frequency; b) determine whether the monitored radio link quality is worse than a predetermined radio link quality threshold; in response to determining that the monitored radio link quality is worse than the predetermined radio link quality threshold: c) measure, during a silent period in which no WCD is transmitting any signal to the RAN node at the first frequency, how much one or more signals transmitted by a first fixed wireless link (FL) node or one or more signals transmitted by a second FL node interferes with the RAN node at the first frequency, wherein the first FL node and the second FL node form a fixed wireless link; and d) provide interference measurement information to a controller configured to manage interference mitigation. The interference measurement information indicates how much the one or more signals from the first FL node or second FL node interferes with the RAN node at the first frequency, and the controller is configured to manage interference mitigation between the first FL node or second FL node and the RAN node based on the interference measurement information.

In some implementations, the RAN node further comprises a communication interface configured to communicate, through a communication channel, with the first FL node and the second FL node.

In some implementations, the one or more transceivers are able to use different beamforming configurations in transmitting different signals.

One aspect of this disclosure presents a fixed wireless link (FL) node that comprises one or more transceivers, a communication interface, and a controller. The one or more transceivers are configured to communicate wirelessly with a second FL node using at least a first frequency so as to form a fixed wireless link. The communication interface is configured to communicate, through a communication channel, with a radio access network (RAN) node serving a wireless communication device, WCD. The controller comprises one or more processors configured to: a) receive, from the RAN node over the communication channel, a request for the first FL node to transmit one or more signals during a silent period in which no WCD is transmitting any signal to the RAN node at the first frequency or a request for the second FL node to transmit one or more signals during the silent period; b) perform at least one of: i) transmitting, during the silent period, the one or more signals and ii) relaying the request to the second FL node; c) receive, from the RAN node through the communication interface, interference measurement information that indicates how much the one or more signals from the first FL node interferes with the RAN node at the first frequency or how much the one or more signals from the second FL node interferes with the RAN node at the first frequency; d) determine, based on the interference measurement information, whether an estimated total interference level, $I_{ToT}$, is worse than a predetermined threshold interference level, $I_{thr}$; and e) in response to determining that $I_{ToT}$ is worse than $I_{thr}$, mitigate interference experienced by the first FL node at the first frequency.

These and other aspects and embodiments are further described herein.

DETAILED DESCRIPTION

Figure 1:
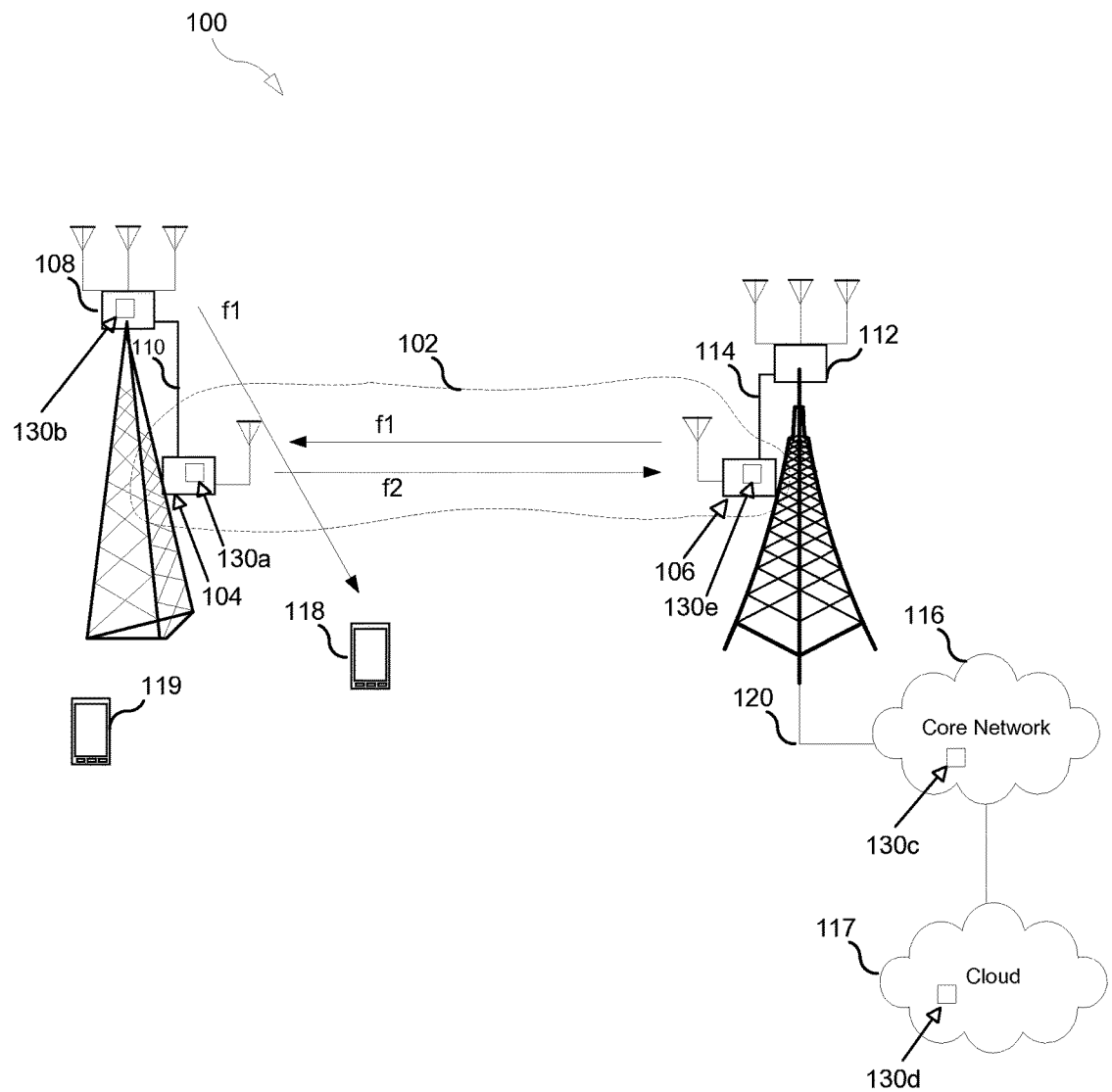
FIG. 1 illustrates an example system in which a radio access network and a fixed wireless link are co-deployed and share a carrier frequency $f_1$.

FIG. 1 illustrates an example system 100 having a co-channel deployment scenario in which wireless services may share a carrier frequency $f_1$. One wireless service may be a fixed wireless link service that provides a fixed wireless link (FL) 102 formed by at least a fixed wireless link (FL) node 104 at one location and a FL node 106 at another location. Each of nodes 104 and 106 may have a directional antenna for communicating with the other node. They may communicate with each other via line-of-sight transmission, or via a relay device, such as an antenna or satellite. Another wireless service may be a radio access service provided by a radio access network (RAN) node 108, such as a NB or eNB that acts as a base station for a RAN cell serving one or more wireless communication devices (WCDs) 118, 119 (e.g., user equipments (UEs)), or a wireless router acting as an IEEE 802.11 or 802.16 access point.

In an example, the FL 102 may form at least part of a wireless backhaul which acts as a relay between a RAN node 108 and a core network 116. This wireless backhaul may be used when it is impractical to lay a wired link from the RAN node to core network 116, or when an existing wired link from the RAN node 108 to core network 116 does not provide sufficient throughput. The FL 102 may thus supplement throughput for an existing wired link between RAN node 108 and core network 116, or eliminate the wired link altogether. The FL 102 may span the gap between two base towers, as illustrated in FIG. 1, between two buildings, between two locations within the same building (e.g., between a rooftop and a floor of the building), or between any other two locations.

As illustrated in FIG. 1, uplink (UL) signals from a WCD such as WCD 118 may be received by RAN node 108, which may communicate the UL signals to FL node 104 over a communication channel. FL node 104 may in turn forward the signals over the FL 102 toward the core network 116. The communication channel 110 between the RAN node 108 and the FL node 104 may be a wired link, as depicted in FIG. 1, or may be a wireless link, or a combination of the two. Once the signals are forwarded from FL node 104 to FL node 106, the latter node may further forward the signals to core network 116. The FL node 106 may do so using a wired link 120, as depicted in FIG. 1, over another fixed wireless link, or a combination thereof. The FL 102 may also forward signals in the other direction. That is, the FL node 106 may also forward signals from the core network toward a WCD. For instance, it may forward the signals from the core network to FL node 104 over the FL 102. The FL node 104 may then forward the signals to RAN node 108, which may communicate them as downlink (DL) signals to the WCD 118 or 119.

In an embodiment, the RAN node 108 and FL node 104 may be located at the same cell phone tower, same rooftop, or in any other co-location scenario. They may be part of the same operator controlled network, or belong to different operators' networks.

In an embodiment, they may be two different devices, with each node having its own controller and antenna or antenna array. For instance, FL node 104 may have a highly directional microwave antenna pointed at a highly directional microwave antenna of FL node 104, while RAN node 108 may have a separate antenna array of, e.g., 4 antennas. In an embodiment, the RAN node 108 and FL node 104 may share components, such as a microprocessor or other controller component.

FIG. 1 further illustrates that FL node 104 may be located at another cell phone tower compared to FL node 106 and RAN node 112. FL node 104 may communicate with RAN node 112 through wireless link 102 and wired link 114, through a separate link, or any other communication channel.

FIG. 1 further illustrates possible locations of a controller that is configured to perform interference mitigation, such as a possible interference mitigation controller 130a that is located in the first FL node 104, a possible interference mitigation controller 130b that is located in the RAN node 108, a possible interference mitigation controller 130c that is located in the core network 116, a possible interference mitigation controller 130d located in the cloud 117, or a possible interference mitigation controller 130e located in the second FL node 106. The interference mitigation controller may receive interference measurement information and determine an interference mitigation scheme. It may inform a relevant node (e.g., RAN node 108 or FL node 104) of the interference mitigation scheme, so that the scheme can be carried out. The node may treat the interference mitigation scheme as a command, or as a non-mandatory recommendation.

Figure 18:
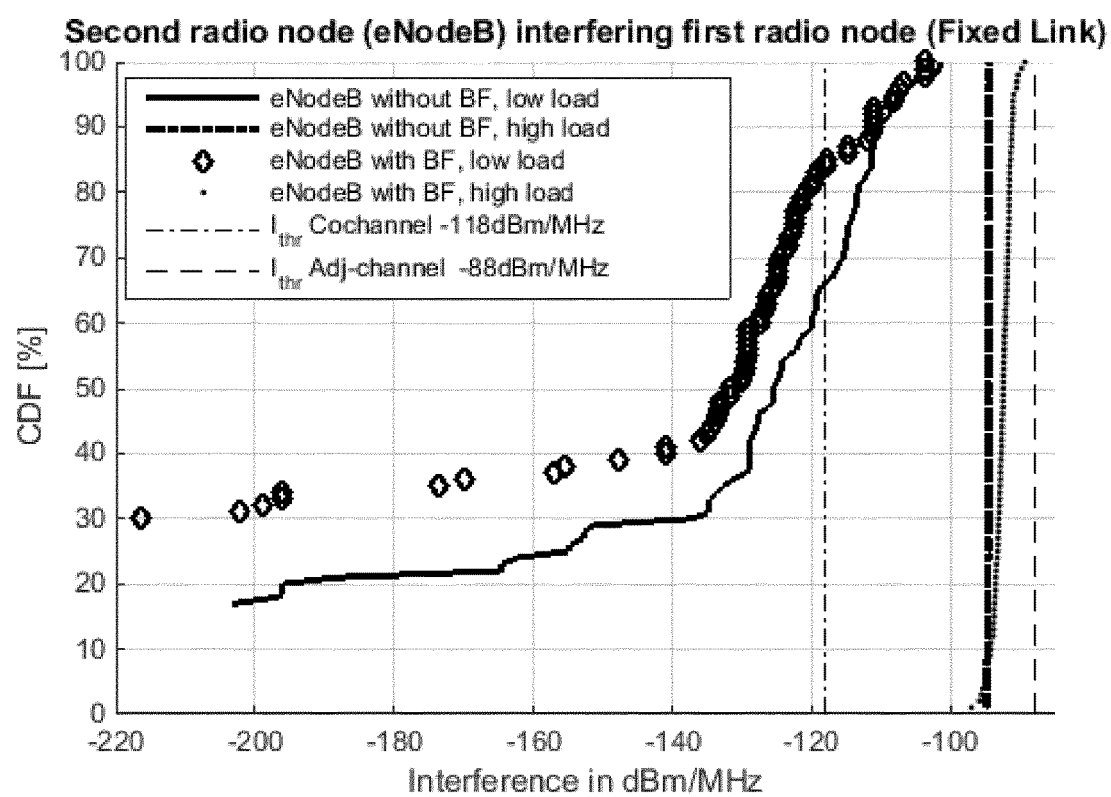
FIG. 18 illustrates a probability of various interference levels in a co-deployment scenario.

In 5G and other future wireless communication systems, co-channel deployment of different wireless services may become more prevalent. FIG. 1 illustrates such a co-channel deployment scenario, in which RAN node 108 may broadcast or otherwise transmit signals using a frequency $f_1$ (e.g., using TDD, FDD, or full-duplex data multiplexing mode), and FL node 104 may also use frequency $f_1$ to receive signals over FL 102. Simulations show that advanced antennas using beamforming may help wireless services co-exist with each other. FIG. 18 illustrates a probability of various interference levels in a co-deployment scenario. However, interference may still be a problem, especially for co-channel deployments, and more so when the nodes have a full buffer (i.e., are highly loaded). As an example, RAN node 108 may create interference for FL node 104 by transmitting DL signals at frequency $f_1$. The transmission may be performed via broadcasting a signal in several directions, or via beamforming to target one or more WCDs (e.g., WCD 118). When frequency $f_1$ is above 6 GHz, beamforming may be beneficial and/or necessary to compensate for path losses due to propagation characteristics of signal transmissions at higher frequencies. Any of the above forms of transmission may cause interference. The use of beamforming transmissions by RAN node 108 may cause severe interference to fixed wireless signals being received over the FL 102 at FL node 104.

The present disclosure thus relates to managing interference between a fixed wireless link service co-deployed with a radio access network operating at a same channel frequency. The principles in this disclosure can, however, be extended to apply to the scenario where the fixed wireless link service and the radio access network operate on adjacent channels, and to the more general scenario of managing interference between any two wireless services, and more specifically between any two nodes sharing a channel frequency (or operating on adjacent channels) for wireless communication.

In an embodiment, the interference management in this disclosure may be divided into a radio link monitoring phase, an interference measurement phase, a measurement information reporting phase, and an interference mitigation phase. In an embodiment, these phases can be preceded by a start-up phase. These phases are discussed in more detail below.

Figure 2:
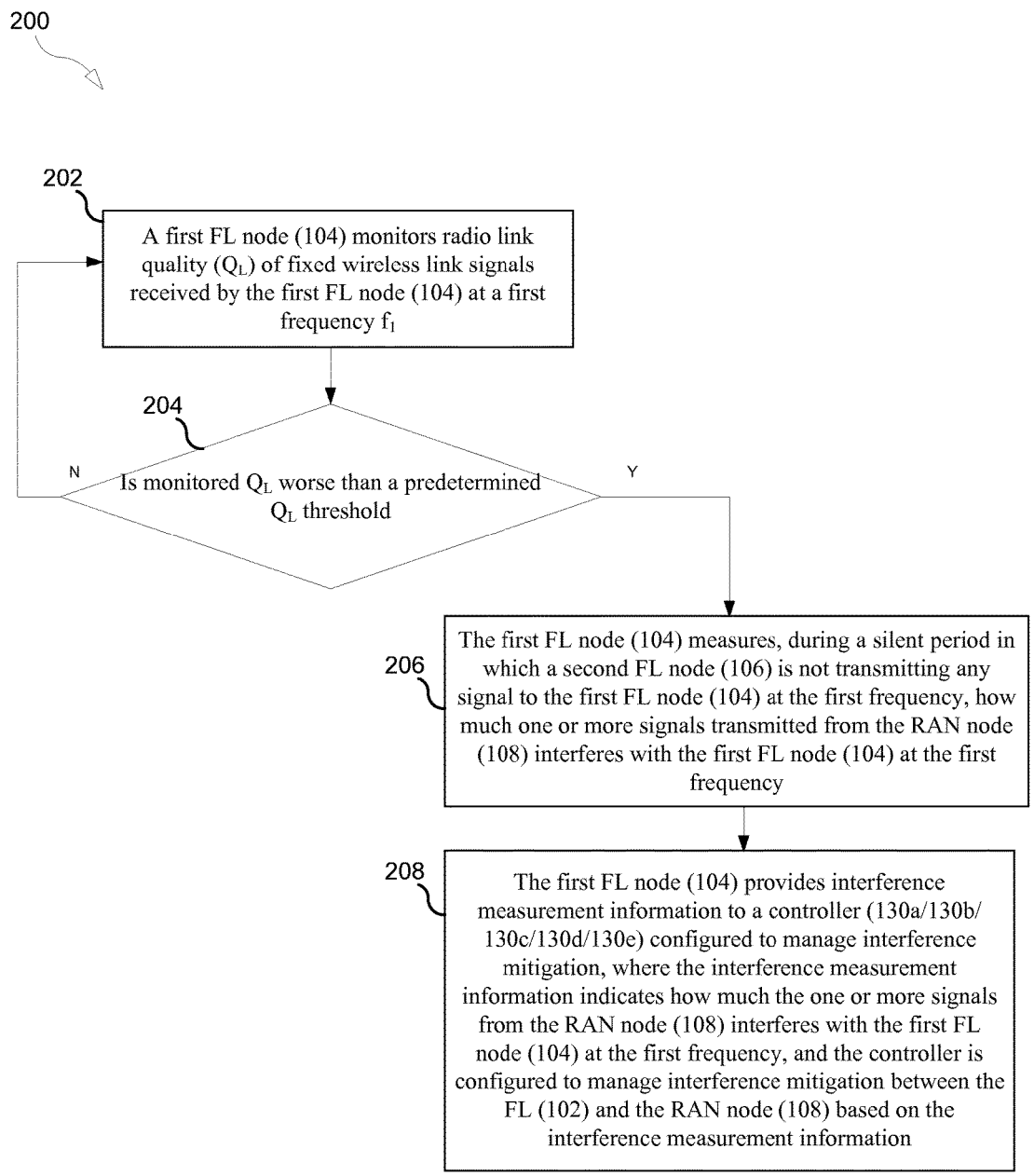
FIGS. 2-3 illustrate flow charts that show example steps of a method according to embodiments of the present disclosure.

FIG. 2 illustrates an example method 200 for managing interference between i) a fixed wireless link (FL) 102 formed by at least a first FL node 104 and a second FL node 106 which are configured to communicate wirelessly with each other at a first frequency (e.g., using directional radio beams) and ii) a radio access network (RAN) node 108 serving wireless communication devices (WCDs). In some cases, the RAN node is communicatively coupled to at least the first FL node 104 through a communication channel 110. The steps described in method 200 may be from the perspective of FL node 104. In an embodiment, the method 200 may include a start-up phase. In an embodiment, the method 200 may omit a start-up phase and begin at step 202, in which the first FL node (104) monitors radio link quality ($Q_L$) of fixed wireless link signals received by the first FL node 104 at a first frequency $f_1$. In an embodiment, this step may be considered a pre-trigger for interference measurement, and may be done on a regular basis. The monitored $Q_L$ may be represented by at least one of the following: achievable or expected data rate on the fixed wireless link, measured bit rate on the fixed wireless link, data throughput on the fixed wireless link, error vector magnitude (EVM) of received signals for the fixed wireless link, signal to interference and noise ratio (SINR), signal to noise ratio (SNR), bit error rate (BER), block error rate (BLER), and transport format for signals received on the fixed wireless link.

In step 204, the first FL node 104 may determine whether the monitored $Q_L$ is worse than a predetermined $Q_L$ threshold. This threshold $Q_L$ may be based on an absolute value (e.g., has the data throughput on the fixed wireless link dropped below an absolute threshold) or a relative value (e.g., has SNR of signals on the fixed wireless link decreased by more than 2 dB).

The deterioration of $Q_L$ past a predetermined $Q_L$ threshold may trigger a measurement event so as to more accurately determine a source of the interference. For instance, in response to determining that the monitored $Q_L$ is worse than a predetermined $Q_L$ threshold, the first FL node 104 in step 206 measures, during a silent period in which the second FL node 106 is not transmitting any signal to the first FL node 104 at the first frequency, how much one or more signals transmitted from the RAN node 108 interferes with the first FL node 104 at the first frequency. The measurement in step 206 is done during a silent period for the fixed wireless link so as to isolate the interference effects of the RAN node 108. During the silent period, the first FL node 104's receiver is active, but the second FL node 106 is not transmitting any signal at the first frequency to the first FL node 104. This way, a signal detected during the silent period may be more confidently attributed to interference and/or noise in the channel.

As discussed in more detail below, the measurement in step 206 may involve coordination with RAN node 108, or may be transparent to RAN node 108. The signals measured during the silent period may be a pilot signal, a reference signal, a data signal, or any other signal. In an embodiment in which the measurement is done with coordination between the FL node 104 and the RAN node 108, the FL node 104 may specify which type of signal it desires the RAN node to transmit.

In step 208, the first FL node 104 provides interference measurement information to a controller 130a/130b/130c/130d/130e configured to manage interference mitigation. The interference measurement information indicates how much the one or more signals from the RAN node 108 interferes with the first FL node 104 at the first frequency, and the controller is configured to manage interference mitigation between the fixed wireless link 102 and the RAN node 108 based on the interference measurement information. For example, if this controller is controller 130b in the RAN node 108, then this step may include the RAN node 104 transmitting the interference measurement information to the RAN node 108 over the communication channel 110. If this controller is controller 130a in FL node 104, then this step may include controller 130a placing the interference measurement information in an area of memory that the controller 130a can access later. If this controller is controller 130c, 130d, or 130e, then this step may include the FL node 104 transmitting the interference measurement information to the controller via the fixed wireless link 102. In an embodiment, the interference measurement information transmitted to the RAN node includes at least one of: i) information about a total signal power received at the first FL node during the silent period, and ii) an estimated total interference level $I_{ToT}$. More details for these steps are discussed below.

Figure 3:
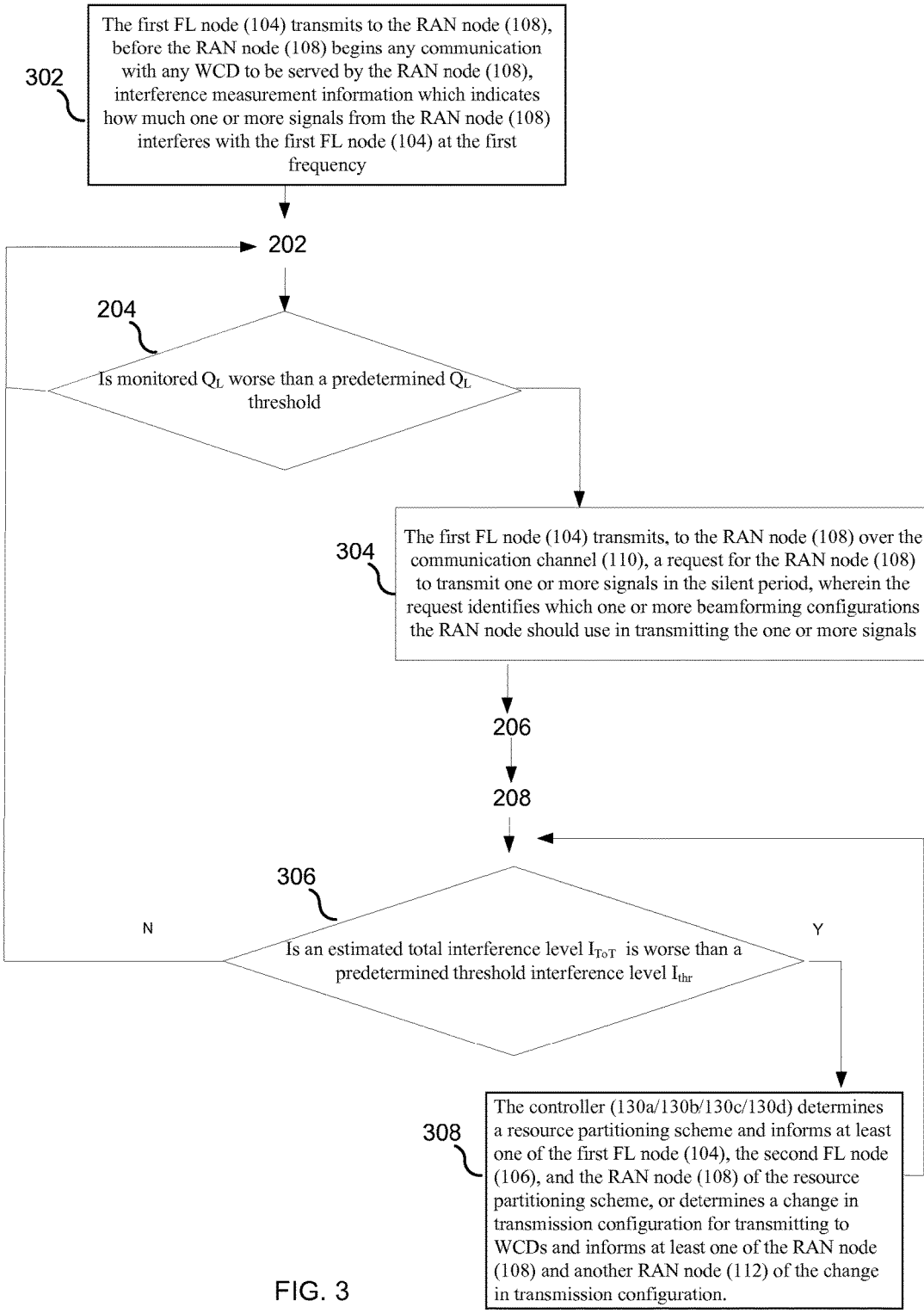

FIG. 3 illustrates additional steps which the FL node 104 may perform to manage interference. In an embodiment, in step 302, the first FL node 104 transmits, to the RAN node 108, interference measurement information which indicates how much one or more signals from the RAN node 108 interferes with the first FL node at the first frequency $f_1$. Step 302 may be performed as part of a start-up phase in which the RAN node 108 requests interference measurement information as part of a procedure similar to listen-before-talk (LBT), or the first FL node 104 sends interference measurement information on its own initiative, without regard to $Q_L$. In one instance, the RAN node 108 may request this information before the RAN node 108 begins any communication with any WCD to be served by the RAN node (e.g., before any DL transmission to any WCD attached to the RAN node 108). Further, the transmission in step 302 may also be performed before any such communication begins. The RAN node 108 may use the information to learn, for example, whether and how it is causing interference to the fixed wireless link 102, preferably before $Q_L$ in the fixed wireless link has a chance to deteriorate past the $Q_L$ threshold. For instance, the RAN node 108 may use this information to learn which beamforming direction used by the RAN node 108 causes interference to the fixed wireless link 102, and subsequently avoid transmitting in that beam direction. If the interference measurement information indicates that none of the transmission configurations used by the RAN node is causing interference to the fixed wireless link 102, this information may provide the RAN node with greater freedom in how it transmits signals.

Performing step 302 may improve the probability that the $Q_L$ of the fixed wires link 102 stays better than the $Q_L$ threshold. However, step 302 may also create unnecessary interference measurement and communication when interference is not an issue in the system. Thus, the first FL node 104 may refrain from performing step 302.

If $Q_L$ does become worse than the predetermined $Q_L$ threshold, the first FL node 104 may measure interference in a manner that is transparent to RAN node 108. Alternatively, the first FL node 104 may coordinate with RAN node 108 to ensure that the RAN node 108 transmits the type of signals that the first FL node 104 desires to measure. For example, in step 304, the first FL node 104 may transmit, to the RAN node 108 over the communication channel 110, a request for the RAN node 108 to transmit one or more signals in the silent period. The request identifies which one or more beamforming configurations the RAN node should use in transmitting the one or more signals. As discussed below, the RAN node may already know when the silent period will occur, or the request may inform the RAN node on the timing of the silent period. In response, the RAN node 108 may transmit one or more signals with the identified one or more beamforming configurations, and those signals may be measured in step 206. This allows interference measurements to be associated with a particular beamforming configuration or set of beamforming configurations.

After the first FL node 104 transmits interference measurement information (e.g., to the RAN node 108) in step 208, or even before or at the same time as step 208, the controller that is configured to manage interference mitigation (e.g., controller 130a or 130b) may determine in step 306 whether an estimated total interference level $I_{ToT}$ is worse than a predetermined threshold interference level $I_{thr}$. $I_{ToT}$ may be part of the interference measurement information reported (or to be reported) to the RAN node in step 208, or may be based on the interference measurement information, and is discussed in more detail below. If the controller is controller 130a, this step may be a determination made by the first FL node 104. If it is controller 130b, this step may be a determination made by RAN node 108.

In some cases, the first FL node 104 and RAN node 108 may be operated by or otherwise under the control and direction of a single organization.

In response to determining that $I_{ToT}$ is worse than $I_{thr}$, the controller (e.g., controller 130a or 130b or 130c) in step 308 may determine an interference mitigation scheme that is, for example, a resource partitioning scheme or a change in transmission configuration for transmitting to WCDs.

In an embodiment, the resource partitioning scheme includes at least one of: i) a time partitioning scheme in which the fixed wireless link and the RAN node use non-overlapping time slots to transmit signals at the first frequency, ii) a frequency partitioning scheme in which the fixed wireless link and the RAN node use different frequencies to transmit signals during overlapping transmission periods, iii) a combination of the time partitioning scheme and the frequency partitioning scheme. As an example, the resource partitioning scheme may assign the fixed wireless link to use $f_1$-$\Delta f$ during time slots in which the RAN is using $f_1$. The controller may inform at least one of the first FL node 104, the second FL node 106, and the RAN node 108 of the resource partitioning scheme. If the resource partitioning scheme does not change resource usage for one of the fixed wireless link or RAN, such as when that one service has higher priority, the controller may refrain from informing nodes of that service, because that service does not need to change its usage. If the controller were controller 130c, 130d, or 130e, it may inform the FL node 104 or the RAN node 108 by using the fixed wireless link 102. The recipient of the interference mitigation scheme from the controller may treat it as mandatory (i.e., as a command), or as a non-mandatory recommendation.

In an embodiment, the change in transmission configuration for transmitting to WCDs includes at least one of: i) another RAN node 112 replacing the RAN node 108 in transmitting signals to the wireless communication device 118; ii) the RAN node 108 using a different beamforming configuration (e.g., beam direction, beam width, beam coverage) than one which was determined to make $I_{ToT}$ worse than $I_{thr}$; iii) the RAN node 108 using a different frequency than the first frequency for future signal transmissions to a WCD 118; and iv) the RAN node 108 reducing an output power used to transmit signals to the WCD 118. The controller may then inform at least one of the RAN node 108 and the other RAN node 112 of the change in transmission configuration. For instance, if the controller determined that another RAN node 112 should replace the RAN node 108 for certain DL transmissions to WCDs, the controller may inform at least the RAN node 112 of the change. In one example, controller 130c may be a radio network controller (RNC) in a UMTS system. In other instances, the RAN node 112 may be uninvolved in the interference mitigation, and may receive no interference mitigation information.

These above features are discussed in more detail below.

Monitoring Radio Link Quality ($Q_L$)

In an embodiment, the monitoring of $Q_L$ of fixed wireless link signals received at the first frequency $f_1$ in step 202 may be performed periodically. The $Q_L$ of the fixed wireless link signals at the first frequency $f_1$ may be represented by or derived from a parameter such as achievable or expected data rate, measured bit rate, data throughput, error vector magnitude (EVM) of received signals, signal to interference and noise ratio (SINR), signal to noise ratio (SNR), bit error rate (BER), block error rate (BLER), transport format, or any combination thereof. Those parameters may all be for the fixed wireless link at $f_1$. Note that while a parameter such as SINR may be a ratio that is influenced by interference at the first FL node 104, additional measurement in step 206 may be needed to actually extract the interference component of the SINR ratio.

In an embodiment, the $Q_L$ may be represented by or derived from the transport format used to encode the fixed wireless link signals received at the first FL node. In an example, the transport format may indicate at least one of: a modulation and coding (MCS) scheme in which the fixed wireless link signals are encoded, a number of transport blocks in a transport channel making up the fixed wireless link, and a code rate. Example transport formats include a MCS combination of "QPSK and code rate of 1/3" or "256 QAM and code rate of 3/4". The former MCS may represent a more robust MCS that may be used when channel quality is deteriorating, while the latter MCS may represent a less robust MCS that is used when channel quality is better. In some cases, the use of a particular MCS may, by itself, lead to an indication that $Q_L$ is worse than a $Q_L$ threshold in step 204. In some cases, $Q_L$ may be derived from the transport format, through the data throughput. In these cases, the data throughput may be calculated based on the MCS, and may indicate a sufficiently worse $Q_L$ in step 204 if the throughput is lower than a predetermined threshold.

Measurement of Interference

Figure 4:
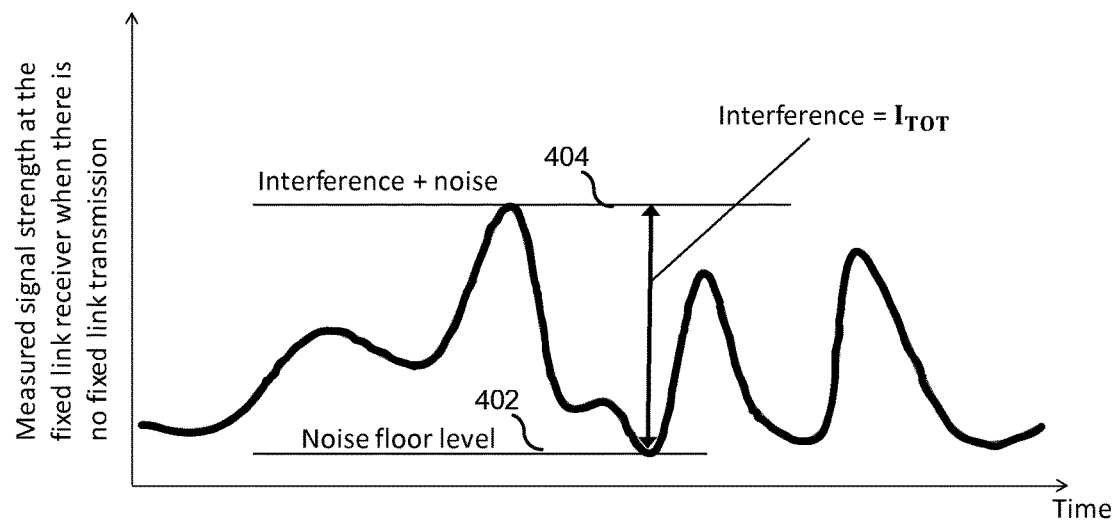
FIG. 4 illustrates a signal detected during a silent period.

In an embodiment, the measurement of interference in step 206 includes performing signal detection during the silent period, so as to determine an interference plus noise level 404, and a noise floor level 402, as illustrated in FIG. 4. The estimated total interference level $I_{ToT}$ may be determined as a difference between the interference plus noise level 404 and the noise floor level 402. The noise floor level 402 may be regarded as a baseline level of channel noise.

Generally speaking, the detected signal or signals at $f_1$ (e.g., digitally filtered to $f_1$ or a narrow bandwidth around $f_1$) during the silent period (in which the first FL node 104 receives no fixed wireless link 102 signals at $f_1$) may be a composite of i) interference from RAN node 108, and ii) noise. The noise may be background noise, such as thermal noise, interference from other nodes (e.g., a distant cell tower), or any other noise. In an example, level 404 may represent the composite signal, while level 402 may represent the noise component of that composite signal. Subtracting them may essentially use the noise floor level 402 to "zero" the interference measurement to extract the component that can be attributed to interference from the RAN node 108.

In some cases, the interference plus noise level 404 may be determined as a maximum signal strength of a signal (e.g., of a filtered signal filtered to $f_1$) or signals that the first FL node detects at the first frequency during the silent period. In some cases, the noise floor level 402 may be determined as a minimum signal strength of the detected signal or signals. In an embodiment, the noise floor level may correspond with a gap between signals (e.g., between two different pilot signals) transmitted by the RAN node 108 during the silent period. During this gap, the detected signal may be attributed solely to noise.

In some cases, statistics of the noise in the channel can be collected (e.g., by the FL node 102 and/or the RAN node 108) and new measurements of the noise may provide a more reliable estimate over time (assuming that the noise level in the channel is constant over time). If noise level varies over time, a time varying function of noise may be used as a time-varying "zero" level for the interference measurement and produce an additional uncertainty in the interference measurement method. This measurement or collection of noise statistics may be performed before $Q_L$ has deteriorated past the $Q_L$ threshold. For instance, the noise floor level could be a predetermined value determined based on statistics collected during a previous silent period in which neither FL node 106 or the RAN node 108 is transmitting on $f_1$, so that background noise could be measured by FL node 104.

Establishment of a Silent Period for the Fixed Wireless Link

During the silent period, the second FL node 106 does not transmit any signal on frequency $f_1$ to the first FL node 104. This allows a signal received during the silent period to be better attributed to other sources, such as interference from the RAN node 108. The silent period may also be referred to as an inactive period or idle period. The silent period discussed herein may assume that the fixed wireless link 102 consists of communication between only the first FL node 104 and second FL node 106. If, in another embodiment, the fixed wireless link 102 includes other FL nodes that are capable of transmitting signals to the first FL node 104, those other FL nodes may also have to remain silent during the silent period.

In an embodiment, the silent period may be established by the fixed wireless link 102, without involvement from the RAN node 108. This may be referred to as an autonomous silent period.

In some instances, the RAN node 108 may not even know about the silent period, and remain oblivious to the silent period and to the measurement being performed or expected to be performed by the first FL node. In such instances, because the RAN node 108 is not expected to even know about the existence of the interference measurement, the first FL node 104 may perform its measurement without coordinating with the RAN node 108, and without requesting the RAN node 108 for any particular type of signal transmission during the silent period.

In some instances, the RAN node 108 may know about the silent period, but may still be uninvolved in establishing the silent period. That is, the silent period may still be autonomously created by the fixed wireless link, which may inform the RAN node 108 on the timing and/or duration of the silent period.

In an embodiment, the RAN node 108 is involved in the creation of the silent period, which may be created by mutual coordination between a node in the fixed wireless link 102 (e.g., the first FL node 104) and RAN node 108. For instance, the first FL node 104 may request that the RAN node 108 agree to periodic silent periods in which fixed wireless link 102 ceases transmission to the first FL node 104 and the RAN node 108 has to transmit one or more signals to be measured by FL node 104. The RAN node 108 may reply with an acknowledgment to indicate agreement with the requested periodic pattern.

The RAN node 108 may obtain the information about the silent period based on pre-defined information, or it may receive the information from another node, such as a core network node (e.g., over a backhaul connection between RAN nodes), FL node 106, or FL node 104 over communication channel 110.

In an embodiment, silent periods for the fixed wireless link can occur (e.g., repeat) according to a predetermined pattern, which may be referred to as a silent period pattern. For instance, a pre-defined rule for the fixed wireless link may dictate that a silent period occurs every second, and has a duration of 5-10 ms. In this instance, if the first FL node 104 needs to perform a measurement in an upcoming silent period, the second FL node 106 may cease transmissions to the first FL node 104 at $f_1$ during the pre-defined silent period, without further coordination between the two nodes. If the second FL node 106 also needs to perform a measurement at its end in the upcoming silent period, the first FL node 104 may also cease transmission to the second FL node 106 at $f_1$ during the silent period.

In an embodiment, there may be no such pre-defined rule, or it may be overridden by mutual coordination between the nodes of the fixed wireless link 102. This allows greater customization or adaptability of the silent periods. As an example, the first FL node 104 may dynamically determine and specify that it desires from the second FL node 106 four silent periods that each lasts 50-100 ms and are 5 seconds apart.

In an embodiment, the silent period may be defined with respect to a reference time. The reference time may be created in any of the following manners: one node (e.g., FL node 104) informs the other node (e.g., FL node 106 or RAN node 108) on when a silent period will start, when it will make a measurement, when to cease transmission, and/or when to transmit a signal; based on or derived from a global reference time or clock (e.g. GPS time); as a predefined reference time, assuming the coordinating nodes have certain common clock.

Measurement Coordination Between Fixed Wireless Link and RAN

As discussed above, the interference measurement being performed during the silent period may be non-transparent to the RAN node 108, such that the RAN node 108 is aware of the silent period, even if it were not involved in creating the silent period. For instance, step 304 reflects a non-transparent scenario in which the first FL node 104 may coordinate with the RAN node 108 on which signal or type of signal the RAN node 108 transmits during the silent period.

In the non-transparent scenario, the RAN node 108 may be aware of the silent period to better ensure that it transmits a signal during the silent period, so that the first FL node 104 has something to measure during the silent period. In one scenario, the RAN node 108 transmits a signal during the silent period without input from the fixed wireless link 102, other than being informed of the timing of the silent period. For example, it may transmit pre-defined pilot signals using pre-defined beamforming configurations during the silent period. In one scenario, the RAN node 108 may receive input in the form of a request that indicates which signal or type of signal (e.g., what beam direction for the signal) the first FL node 104 expects to measure during the silent period.

Figure 5:
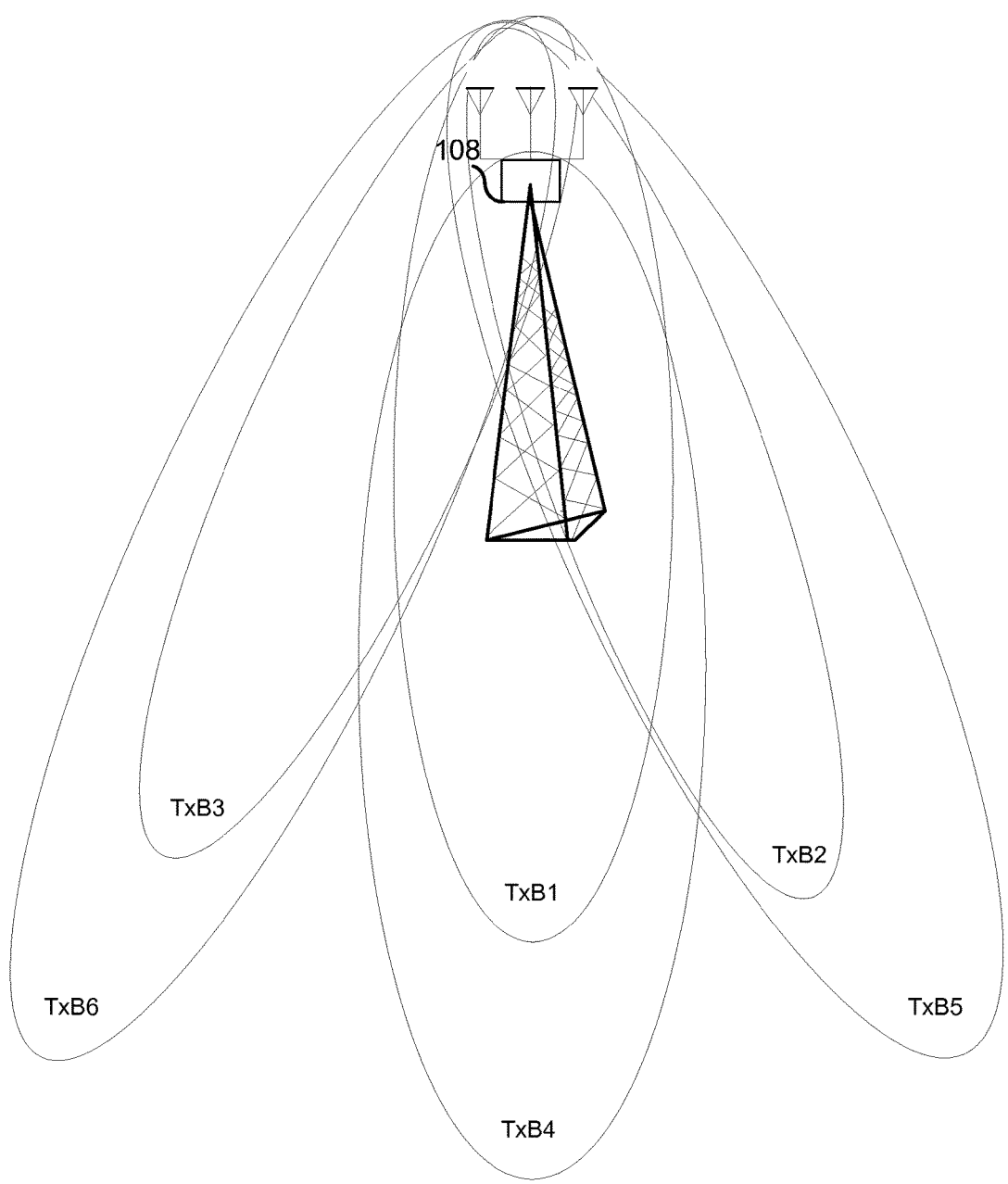
FIG. 5 illustrates various signal beams that can be transmitted by a transmitting node.

This form of coordination allows the RAN node to transmit signals in a manner desired by the FL node performing the interference measurement. As an example, this coordination allows the FL node to specify which signal or type of signal it needs from the RAN node to complete its desired measurements. For example, the first FL node 104 may transmit, to the RAN node 108, a request for the RAN node 108 to transmit one or more signals in the silent period, where the request identifies which one or more beamforming configurations the RAN node should use in transmitting the one or more signals (assuming the RAN node is able to perform beamforming). Examples of the beamforming configuration include beam direction and beam coverage. FIG. 5 illustrates different beams (TxB1 through TxB6) having different beam directions and beam coverage. The beamforming configuration may also include an output power at the RAN node, which can affect beam coverage. The RAN node 108 may use the request to transmit signals on separate beams that have the desired beamforming configuration or configurations. This coordination allows the FL node 104 to identify interference measurement corresponding to different beamforming configurations.

Figure 6A:
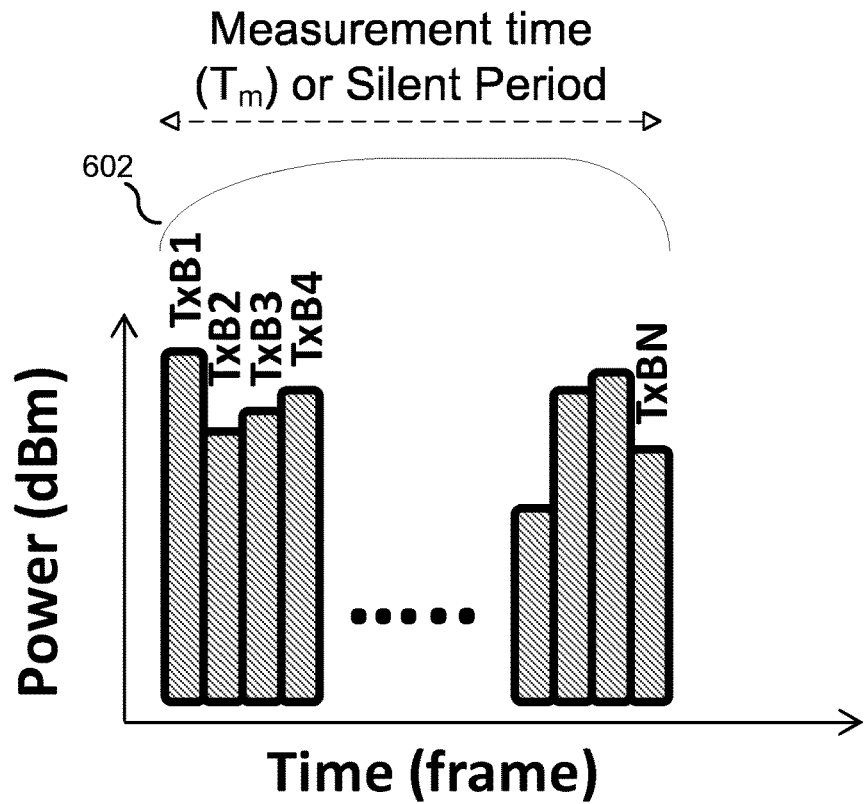
FIG. 6A illustrates various signal beams that can be transmitted by a transmitting node.
Figure 7A:
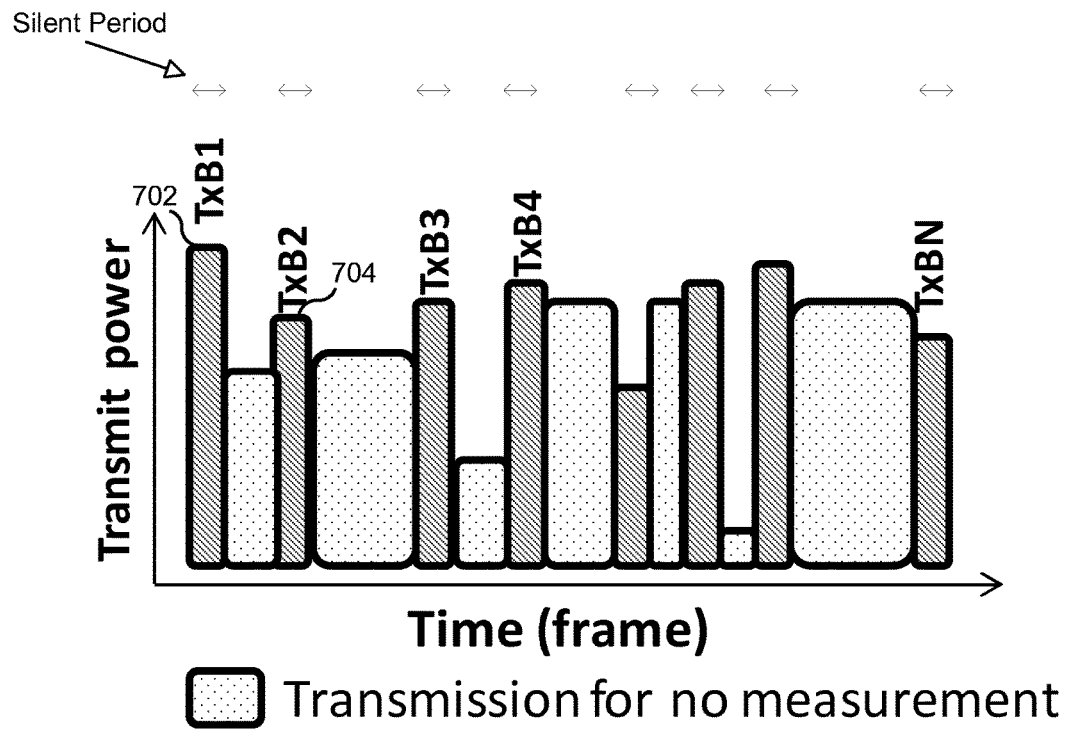
FIG. 7A illustrates various signal beams that can be transmitted by a transmitting node.

In an embodiment, the first FL node 104 measures, during the silent period, each signal in a group 602, 702 of one or more signals from the RAN node 108 corresponding to a group of one or more beamforming configurations which the RAN node 108 is able to use in transmitting signals, as illustrated in FIGS. 6A and 7A. The group may be one of one or more beamforming configurations that includes all beam directions in which the RAN node 108 is capable of transmitting, or only a subset of all beam directions in which the RAN node 108 is capable of transmitting. If only a subset 702 of the beam directions is transmitted in a silent period, another group 704 of one or more signals corresponding to a different subset of beam directions may be transmitted in subsequent silent periods.

Figure 6B:
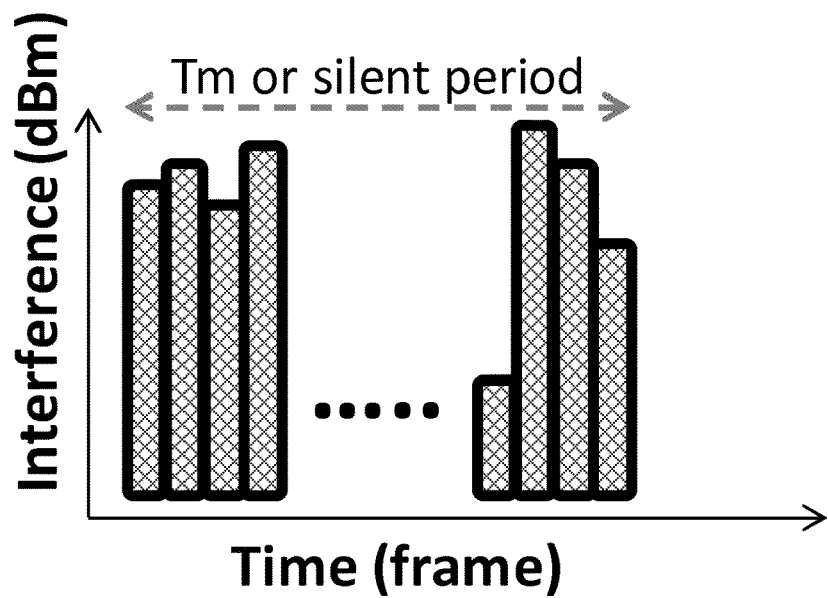
FIG. 6B illustrates various signal beams that are detected in a silent period by a measuring node.

More specifically, FIG. 6A illustrates an example in which the RAN node 108 may transmit a plurality of signal beams (TxB1 through TxBN) during a silent period or during a measurement time $T_m$. $T_m$ may be a portion of the silent period, or may be equal to the silent period. FIG. 6B illustrates how those signal beams are detected at the FL node 104. In an embodiment, the desired beam pattern for the silent period may have been determined by the FL node 104, which may identify them in a request to the RAN node. The FL node 104 may then receive the desired beams from the RAN node during the silent period, and match them to the beam configurations identified in the request. In another embodiment where there is no coordination with the FL node, the beam pattern may be pre-defined, in which case the RAN node 108 may obtain the pattern from its memory.

In an embodiment, the FL node 104 may measure, during one silent period, N+1 signal beams transmitted by RAN node 108. The N+1 signal beams may, for example, correspond to all beamforming configurations available to the RAN node 108, or some subset of those configurations, such as all beam directions or all levels of transmit power in which the RAN node 108 is capable of transmitting. The total time $T_m$ required by the first FL node 104 for measurement during each silent period may be the sum of the times over which the RAN node 108 transmits all N+1 beams during the silent period. This can be expressed as:

$$Tm = \sum_{i=0}^{N} TxBi,$$

where TxBi represents the ith beam that is transmitted.

In an embodiment, the different signal beams to be measured by the first FL node 104 may be grouped into two or more groups of beams. FIG. 7A illustrates different groups 702, 704 that each includes one beam. During each silent period, only one of the groups may be transmitted, and the FL node 104 may measure that group of beams. If there are L beam groups, then each beam group is transmitted with a period of $T_P/L$, where $T_P$ is the periodicity with which each idle period occurs in the idle period pattern. For example, if there were only two beam groups (beam group A and beam group B), then beams in group A and beams in group B can be transmitted repeatedly in alternate silent periods.

Figure 7B:
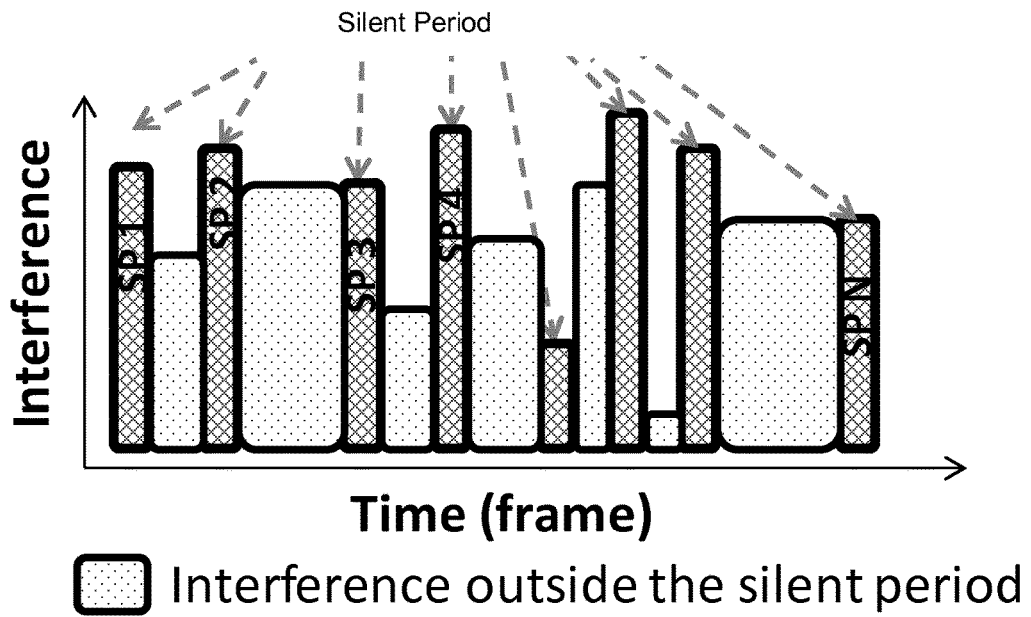
FIG. 7B illustrates various signal beams that are detected in different silent periods by a measuring node.

FIG. 7A illustrates an embodiment in which RAN node 108 may transmit only one beam per silent period. FIG. 7B illustrates how the beam is correspondingly detected at the FL node 104. In one example, the different beams (e.g., TxB1, TxB2, TxB3) may have different beam directions or different transmit powers. As shown in FIG. 7B, TxB1 may correspond to interference measurement in a silent period 1 (SP1). More generally, TxBN may correspond to interference measurement in silent period N. If FL node 104 knows which beams or beamforming configurations the RAN node used, it can match the detected signals to the respective beams or beamforming configurations.

In an embodiment, the mapping of a particular silent period to a particular beam configuration (e.g., direction) may be governed by a rule. The rule may be pre-defined, or may be established by coordination between the RAN node and the FL node 104. The rule may enable the FL node 104 to accurately perform the measurement and determine which measurement is done on which beam configuration. In an embodiment, the beam transmissions may be performed by transmitting pre-determined (e.g., standardized) pilot signals, such as reference signals.

It should be noted that multiple nodes (e.g., multiple FL nodes) may measure a signal transmitted from RAN node 108, and may do so simultaneously.

Reporting of Interference Measurement Information

In step 208, the first FL node 104 provides interference measurement information to a controller 130a/130b/130c/130d/130e configured to manage interference mitigation between the FL 102 and the RAN based on the interference measurement information. If the controller is a controller (e.g., 130b) located in or otherwise part of the RAN node 108, then the FL node 104 transmits the interference measurement information to the RAN node 108 over the communication channel 110. If the controller is a controller (e.g., 130a) located in or otherwise part of the FL node 104, then the FL node may provide that information to a portion of memory that is accessible to the controller. This may be done by the same controller. For instance, the controller may execute interference measurement instructions which obtain the interference measurement information and store them in memory. The controller may then execute interference mitigation instructions which access the interference measurement information from the memory. The interference measurement information allows the controller to assess whether and how much interference the RAN node 108 is causing for the fixed wireless link 102, and to potentially take steps to mitigate that interference.

In an embodiment, the RAN node 108 may transmit, to controller 130a in FL node 104 or to another controller, information on, e.g., which beamforming configurations the RAN node 108 used. In situations in which the FL node 104 and the RAN node 108 did not coordinate before the silent period, this information from the RAN node 108 may allow the controller 130a to better to determine what type of signals the FL node 104 measured. For example, the controller 130a may receive, from the RAN node 108, information about beam direction, output power, or beam width of the one or more signals that the node 108 transmitted during the silent period.

The interference information provided to the interference mitigation controller may include total received power of a signal detected during the silent period, an estimated interference $I_{ToT}$, or any combination thereof. The total received power may be a function of time of the signal detected at FL node 104 after being filtered to $f_1$, or may be the maximum signal strength (e.g., interference plus noise level 404).

In an embodiment, if the silent period and interference measurement had been transparent to the RAN node, the FL node 104 may perform the interference measurement in a silent period of duration $T_0$, and provide the interference measurement information to the interference mitigation controller (e.g., controller 130b) after $T_0$ has elapsed. If the RAN node 104 has established or expects to use N silent periods, the total duration of the silent periods for the fixed wireless link would be $N(T_0)$.

In an embodiment in which the measurements were transparent to the RAN node 108 and the measurement information is being transmitted to a controller in the RAN node 108, the first FL node 104 does not expect any acknowledgment from the RAN node 108, because the RAN node 108 was not informed of the silent periods. Further, the first FL node 104 may tolerate loss of information or error in this information reporting by refraining from retransmitting the interference measurement information.

Figure 8:
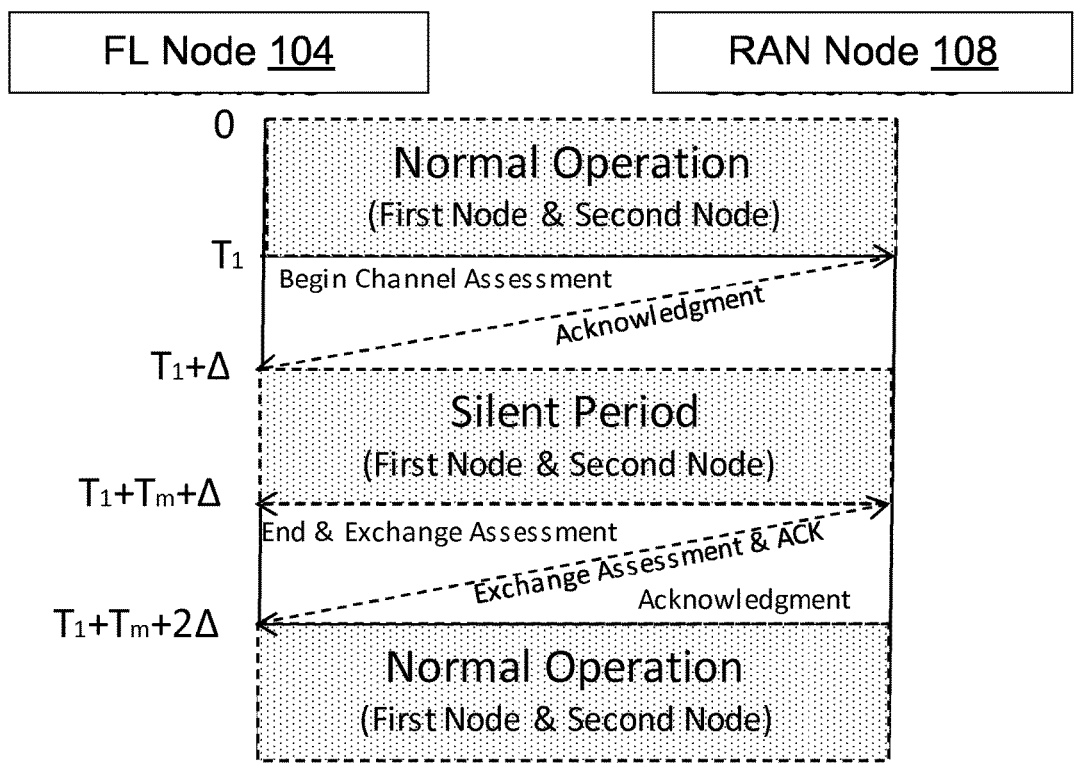
FIG. 8 illustrates interference measurement and reporting of interference measurement information.

In an embodiment illustrated in FIG. 8, if the silent period was non-transparent to the RAN node 108, such that it was aware of the silent period, the first FL node 104 may inform the RAN node 108 that it wants to perform the measurements for the channel assessment during a silent period. For instance, this procedure begins at time $T_1$. At $T_1$, the first FL node 104 may begin to await an acknowledgment or other positive response from the RAN node 108 before starting the silent period. The acknowledgment (ACK) may indicate that the RAN node is ready to assist the first FL node in performing measurements for the channel assessment of co-channel (e.g., the channel at frequency $f_1$) interference. The RAN node is considered to be ready to assist if it is able to transmit beams during the silent periods created by the first node. The RAN node 108 sends an acknowledgment (ACK) within an interval of $\Delta$ from the time $T_1$. Once the RAN node 108 acknowledges at $T_1+\Delta$, the first FL node 104 can start the silent period, during which one or several beams are transmitted by the RAN node 108. The time duration of this silent period can be defined as $T_m$.

Once the beams are transmitted by the RAN node 108 at $T_1+T_m+\Delta$, the RAN node 108 may request the first FL node 104 to end the silent period and send the interference measurement information about the performed measurements. On receiving this request, the FL node 104 may send an acknowledgement and the measurement information to an interference mitigation controller 130b in the RAN node 108, which may take a duration of $\Delta$. The RAN node 108 further acknowledges the reception of information and normal operation begins at both nodes at $T_1+T_m+2\Delta$. That is, they may both resume their normal fixed wireless link and cellular operations, respectively. During the silent period, the measurement could be done for a particular beam or for one or more group of beams or for all the beams as mentioned above.

Mitigating Interference

Once the interference has been measured, the information about measurement results can be reported by the FL node 104 to a controller (e.g., controller 130b in RAN node 108) configured to manage interference mitigation between the fixed wireless link and RAN based on the measurement results. Managing interference mitigation may include determining whether an estimated interference $I_{ToT}$ is worse than a threshold level, and determining an interference mitigation scheme. The interference mitigation scheme may be based on the interference measurement information, or may be predetermined in a way that is not based on the interference measurement information. The controller may inform a relevant node of the interference mitigation scheme. That node may be required to use the interference mitigation scheme, or may treat the interference mitigation scheme as a non-mandatory recommendation.

Examples of an interference mitigation scheme includes a resource partitioning scheme and a change in transmission configuration for transmitting to WCDs (i.e., for DL transmissions to WCDs). In an embodiment, the change in transmission configuration for transmitting to WCDs includes at least one of: i) another RAN node 112 replacing the RAN node 108 in transmitting signals to the wireless communication device 118; ii) the RAN node 108 using a different beamforming configuration (e.g., beam direction, beam width, beam coverage) than one which was determined to make $I_{ToT}$ worse than $I_{thr}$; iii) the RAN node 108 using a different frequency than the first frequency for future signal transmissions to a WCD 118; and iv) the RAN node 108 reducing an output power used to transmit signals to the WCD 118. For instance, a controller 130c in the core network may decide to replace the RAN node 108 with the RAN node 112 for DL transmissions to at least some WCDs currently being served by RAN node 108. In such an instance, the relevant node(s) to be informed of the change may be the RAN node 112 and/or RAN node 108. In another instance, a controller 130b in the RAN node 108 may decide that the node 108 needs to stop using a particular beam direction that was determined to make $I_{ToT}$ worse than $I_{thr}$. In that instance, the relevant node to be informed of the change may be the RAN node 108 itself. For example, the controller 130b may instruct the transceiver in the RAN node 108 to stop using that beam direction.

Figure 9:
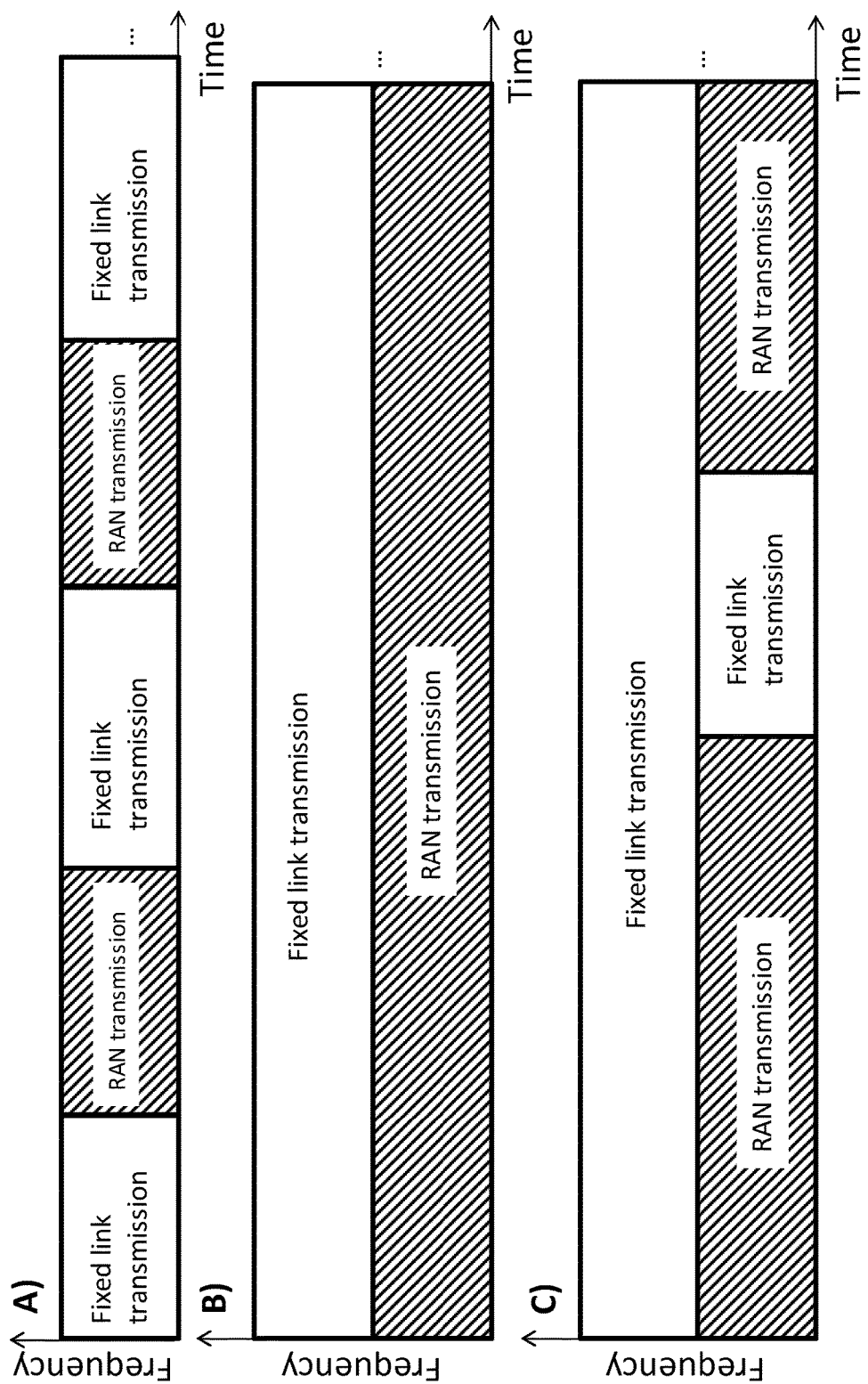
FIG. 9 illustrates resource partitioning schemes for mitigating interference.

In one embodiment, mitigation may be reduced through resource partitioning between the RAN and the fixed wireless link. The resource partitioning pattern allows the two services to use resources that are orthogonal with each other. The resource partitioning pattern can vary over time depending on the load in each service and interference situation. As illustrated in FIG. 9, examples of the resource partitioning scheme includes at least one of: i) a time partitioning scheme in which the fixed wireless link and the RAN node use non-overlapping time slots to transmit signals at the first frequency, ii) a frequency partitioning scheme in which the fixed wireless link and the RAN node use different frequencies to transmit signals during overlapping transmission periods, iii) a combination of the time partitioning scheme and the frequency partitioning scheme.

In the above example, the relevant node(s) to be informed of the resource partitioning scheme may include the RAN node 108, FL node 104, and/or FL node 106. In one example, if the resource partitioning scheme does not make any change to resource usage by the RAN node 108, the relevant node(s) to be informed may include only the FL node 104 and/or the FL node 106 of the FL 102. In another example, if the resource partitioning scheme does not make any change to resource usage by the fixed wireless link 102, then the relevant node to be informed of the scheme may include only the RAN node 108. The resource partitioning may be applied to a subset or all of the beamforming configurations. The remaining (for the case of a subset) beamforming configurations (e.g., which do not cause excessive interference to the FL node 104) may be used by the RAN node 108 without considering the resource partitioning, e.g., in a default manner.

As one example, in response to determining that $I_{ToT}$ is worse than $I_{thr}$, a controller 130a in the first FL node 104 may perform step 308 by determining a resource partitioning scheme between the FL node 104 and RAN node 108, and requesting that the RAN node 108 adopt the scheme. The request may include at least one of: i) requesting the RAN node to use a time partitioning scheme in which the fixed wireless link and the RAN node use non-overlapping time slots to transmit signals at the first frequency; ii) requesting the RAN node to use a frequency partitioning scheme in which the fixed wireless link and the RAN node use different frequencies to transmit signals during overlapping transmission periods; and iii) requesting the RAN node to use a combination of the time partitioning scheme and the frequency partitioning scheme.

In an embodiment, step 308 may be performed by a controller 130*b* in the RAN node 108 without participation from the fixed wireless link 102, such as when the RAN node 108 unilaterally stops using $f_1$, or certain timeslots on $f_1$, and leaves that frequency for the fixed wireless link to use.

In an embodiment, step 308 may be performed by a controller 130*a* in the FL node 104 and without participation from the RAN node 108, such as when the FL node 104 unilaterally stops the use of $f_1$, or certain timeslots on $f_1$, and leaves the RAN node 108 to use that frequency.

In an embodiment, step 308 may be followed by ratification from the fixed wireless link 102 and/or RAN node 108 of the resource partitioning scheme, or may be followed by further negotiation between the controller and the fixed wireless link 102 and/or RAN node 108 on the resource partitioning.

In an embodiment, the transmission configuration for transmitting to WCDs may be changed by having the RAN node 108 stopping using beams that cause excessive interference (measured as above the threshold $I_{thr}$). The corresponding users earlier served by the interfering beams may be served by one or combination of: i) another RAN node not interfering with the first FL node (in the case such alternative RAN node exists); ii) with another beam; and iii) on another carrier frequency.

In an embodiment, the transmission configuration for transmitting to WCDs may be changed by having the RAN node 108 performing at least one of the following: i) not creating one or plurality of beams in the direction of the FL radio network node; ii) reduce the power of one or more beams, especially those which cause more severe interference at the first FL node; using another carrier frequency (e.g., an adjacent channel frequency $f_2$) if several beams need to be turned off; turn off its primary carrier ($f_1$) and instead swap it with one of several secondary carrier frequencies (e.g. of SCell (secondary serving Cell)) for serving WCDs, if the WCDs are served using multi-carrier operation; reduce total output power of the RAN node to reduce interference at the FL node by, e.g., creating an interference exclusion zone.

As an example, in response to determining that $I_{ToT}$ is worse than $I_{thr}$, a controller 130*a* in the first FL node 104 requests the RAN node 108 to change a manner of signal transmission in its RAN to reduce interference at the first FL node by performing at least one of: i) requesting another RAN node 112 to replace the RAN node 108 in transmitting signals to one or more wireless communication devices 118; ii) requesting the RAN node 108 use a different beamforming configuration than one which was determined to make $I_{ToT}$ worse than $I_{thr}$; iii) requesting the RAN node 108 to use a different frequency than the first frequency for future signal transmissions to WCDs 118; and iv) requesting the RAN node 108 to reduce an output power used to transmit signals to WCDs 118.

In an embodiment, a controller 130*b* in the RAN node 108 may unilaterally cause the RAN node 108 to change its manner of signal transmission, based on interference measurement information from the FL node 104, without a request from the FL node.

Locating Other Interfering RAN Node

As discussed above, the interference measurement in the silent period may focus on whether interference from the RAN node 108 is responsible for the deteriorating $Q_L$. In some instances, the deterioration of $Q_L$ may primarily be caused by interference from a different node, such as a RAN node from an adjacent cell. Thus, in an embodiment, the first FL node (104) determines, based on the interference measurement information, whether an estimated total interference level $I_{ToT}$ caused by the RAN node 108 is worse than a predetermined threshold interference level $I_{thr}$. In response to determining that $I_{ToT}$ is not worse than $I_{thr}$, the first FL node 104 measures (e.g., in a subsequent silent period) how much one or more signals transmitted from another RAN node 112 interferes with the first FL node 104 at the first frequency $f_1$, wherein in the embodiment the RAN node 108 is the closest RAN node to the first FL node 104 and the other RAN node 112 is the second closest RAN node to the first FL node 104. The closeness may be based on, e.g., a geographic distance or a hop count. The FL node 104 and the RAN node 112 may communicate over the fixed wireless link 102, or in some other manner.

Interference Measurement for Fixed Wireless Link from Perspective of RAN Node

The steps illustrated above discuss the interference measurement from the perspective of the first FL node 104. The steps below discuss example steps of the interference measurement from the perspective of the RAN node (e.g., RAN node 108).

Figure 10:
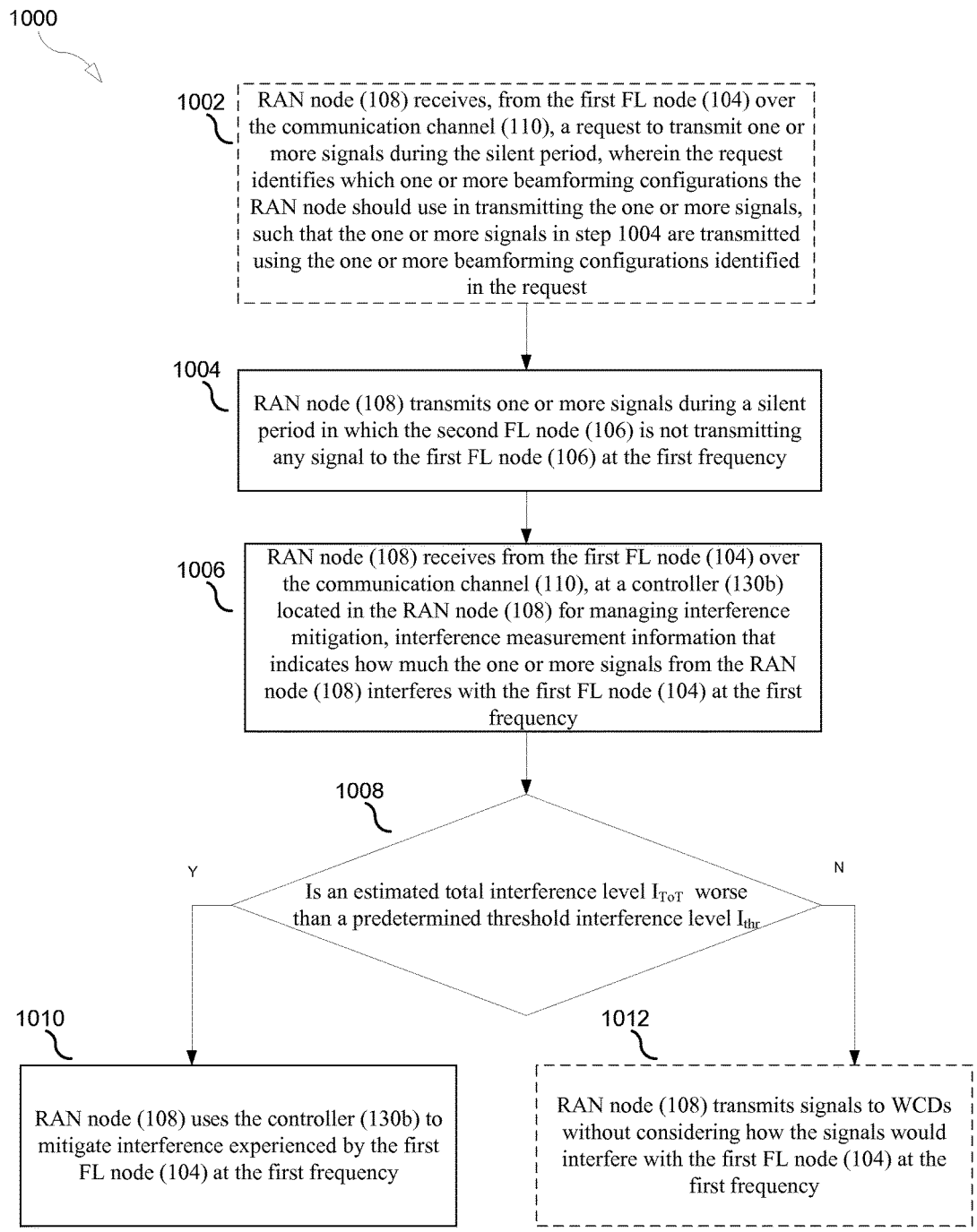
FIGS. 10-13 illustrate flow charts that show example steps of methods according to embodiments of the present disclosure.

FIG. 10 illustrates example steps for a method 1000 for managing interference between i) a fixed wireless link 102 formed by at least a first FL node 104 and a second FL node 106 which are configured to communicate wirelessly with each other at a first frequency $f_1$ and ii) a radio access network (RAN) node 108 serving wireless communication devices (WCDs) and communicatively coupled to at least the first FL node 104 through a communication channel 110. In an embodiment, the RAN node 108 is able to use different beamforming configurations in transmitting different signals.

In some implementations, the method 1000 may begin with a start-up phase, discussed below in more detail. In some implementations, the method 1000 may begin at step 1002, which is also discussed below in more detail. In some implementations, method 1000 may begin with step 1004, in which the RAN node 108 transmits one or more signals during a silent period in which the second FL node 106 is not transmitting any signal to the first FL node 106 at the first frequency. In some cases, the RAN node 108 may transmit a group of signals that correspond to all beam directions in which the RAN node 108 is capable of transmitting. In some cases, it may transmit only a subset of all beam directions in the silent period. During a subsequent silent period, it may transmit another group of one or more signals corresponding to a different subset of beam directions in which the RAN node 108 is capable of transmitting.

In step 1006, the RAN node 108 receives from the first FL node (104) over the communication channel 110, at a controller 130*b* located in the RAN node 108 for managing interference mitigation, interference measurement information that indicates how much the one or more signals from the RAN node 108 interferes with the first FL node 104 at the first frequency.

In step 1008, the RAN node 108 uses the controller 130*b* to determine, based on the interference measurement information, whether an estimated total interference level $I_{ToT}$ is worse than a predetermined threshold interference level $I_{thr}$.

For example, controller 130b may execute instructions to receive and store the interference measurement information, and then execute instructions to determine whether $I_{ToT}$ is worse than $I_{thr}$. $I_{ToT}$ may be part of the received interference measurement information, or the controller 130b may derive $I_{ToT}$ from the received interference measurement information (e.g., by subtracting a maximum interference plus noise level 404 by a noise floor level 402).

In step 1010, in response to determining that $I_{ToT}$ is worse than $I_{thr}$, the RAN node 108 may use the controller 130b to mitigate interference experienced by the first FL node 104 at the first frequency. Thus, after the controller 130b performs the determination in step 1008, it may perform the interference mitigation in step 1010. This step may be done in response to a request from the first FL node 104 or second FL node 106, or may be done on the RAN node's own initiative, without such a request.

In an embodiment, step 1010 may be performed by determining a resource partitioning scheme that includes at least one of: resource partitioning scheme that includes at least one of: i) a time partitioning scheme in which the fixed wireless link and the RAN node use non-overlapping time slots to transmit signals at the first frequency, ii) a frequency partitioning scheme in which the fixed wireless link and the RAN node use different frequencies to transmit signals during overlapping transmission periods, and iii) a combination of the time partitioning scheme and the frequency partitioning scheme. The controller may then inform at least one of the first FL node (104), the second FL node (106), and the RAN node (108) of the resource partitioning scheme. As discussed above, the resource partitioning may in some cases be applied to only a subset of beamforming configurations, such as those beamforming configurations (e.g., beam directions) which have been determined to cause $I_{ToT}$ to be greater than $I_{thr}$, while the remaining beamforming configurations may continue to be used in a default manner.

In an embodiment, step 1010 may be performed by determining a change in transmission configuration for transmitting to WCDs. The change can include at least one of: i) another RAN node replacing the RAN node (108) in transmitting signals to a WCD (118); ii) the RAN node (108) using a different beamforming configuration than one which was determined to make $I_{ToT}$ worse than $I_{thr}$; iii) the RAN node (108) using a different frequency than the first frequency for future signal transmissions to the WCD (118); and iv) the RAN node (108) reducing an output power at the RAN node (108) used to transmit signals to the WCD (118). The controller may inform at least one of the RAN node (108) and the other RAN node (112) of the change in the transmission configuration.

In step 1012, if $I_{TOT}$ is not worse than $I_{thr}$, the RAN node 108 may transmit signals to WCDs without considering how the signals would interfere with the first FL node 104 at the first frequency.

In an embodiment, method 1000 includes step 1002, in which the RAN node 108 receives, from the first FL node 104 over the communication channel 110, a request to transmit one or more signals during the silent period, wherein the request identifies which one or more beamforming configurations the RAN node should use in transmitting the one or more signals. In this embodiment, the one or more signals in step 1004) may be transmitted using the one or more beamforming configurations identified in the request. In some cases, the RAN node may also receive information on when and how long the silent period will occur.

In an embodiment, the steps may be preceded by a start-up phase. The start-up phase may occur before the RAN node 108 transmits any signal to WCDs to be served by the RAN node 108, and may be part of a LBT-like procedure. In this phase, the RAN node 108 may transmit different signals using different beam directions (or other forms of different beam configurations). The RAN node 108 may request interference measurement from the first FL node 104 corresponding to the different beam directions. The RAN node 108 can then determine, based on the interference measurement information, whether any of the beam directions interferes with the fixed wireless link at $f_1$. This determination may involve determining whether the interference is worse than $I_{thr}$. This start-up phase allows the RAN node 108 to avoid transmitting signals in those beam directions (or other forms of beam configurations).

Interference Caused by the Fixed Wireless Link to the RAN

The above discussion relates to a situation in which transmissions in a RAN is causing interference for a fixed wireless link. However, interference may also occur in the opposite direction, in which the fixed wireless link interferes with the RAN at frequency $f_1$. This may occur when, for instance, a beam width of a signal in the fixed wireless link is sufficiently wide to interfere with the RAN node. The principles discussed above for the various phases (e.g., monitoring phase, measurement phase, mitigation phase) may be applied to this situation as well.

Figure 11:
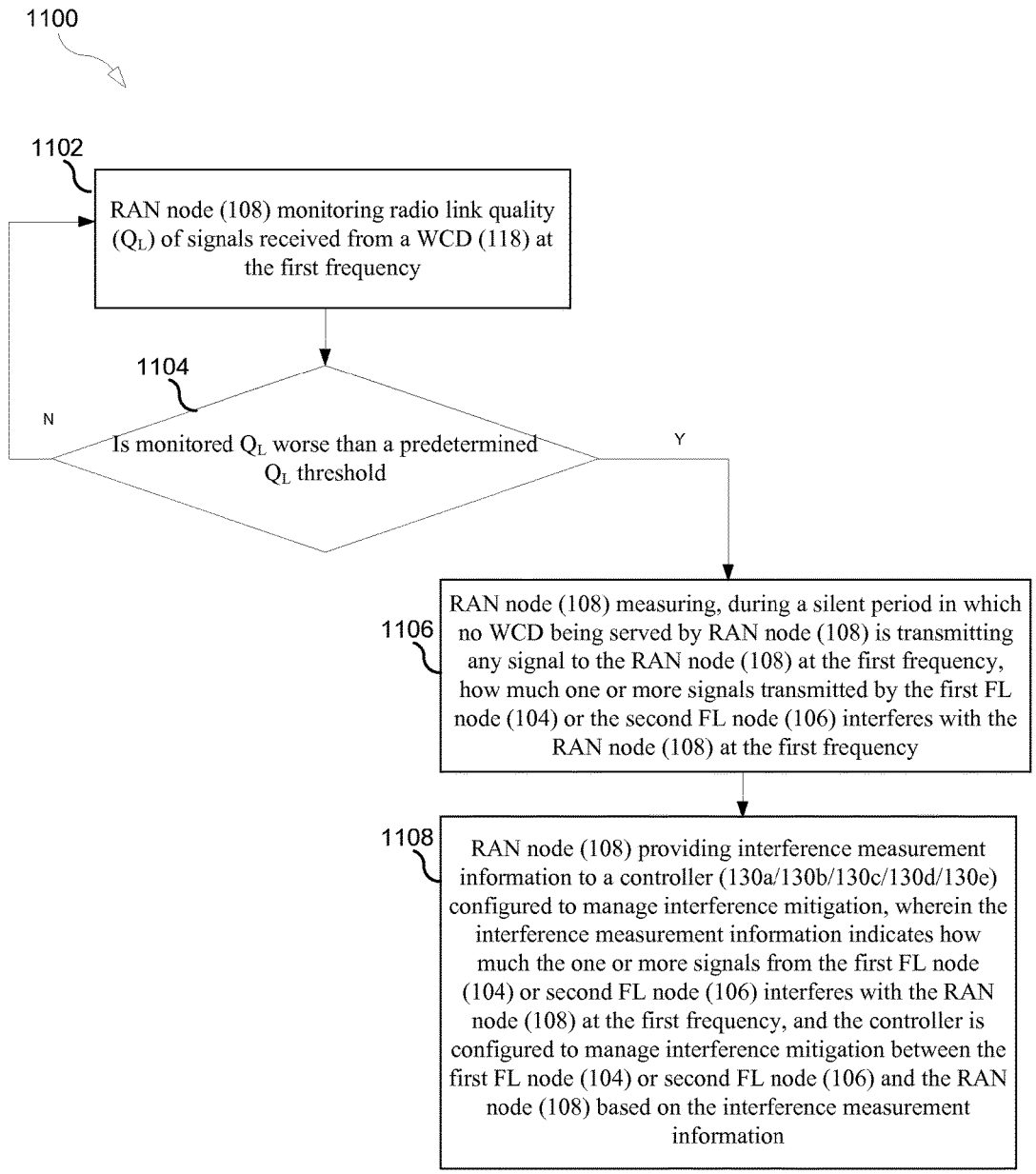

FIG. 11 illustrates example steps of a method 1100 for managing interference between i) a fixed wireless link (FL) 102 formed by a first FL node 104 and a second FL node 106 which are configured to communicate wirelessly with each other at a first frequency and ii) a radio access network (RAN) node 108 serving one or more wireless communication devices WCDs and communicatively coupled to at least the first FL node 104 through a communication channel 110.

In an embodiment, method 1100 may begin at step 1102, in which the RAN node 108 monitors $Q_L$ of signals received from the WCD 118 at the first frequency.

In step 1104, the RAN node 108 determines whether the monitored $Q_L$ is worse than a predetermined $Q_L$ threshold.

In step 1106, in response to the RAN node (108) determining that the monitored radio link quality is worse than the predetermined radio link quality threshold, the RAN node 108 measures, during a silent period in which no WCD being served by the RAN node 108 is transmitting any signal to the RAN node 108 at the first frequency $f_1$, how much one or more signals transmitted by the first FL node 104 or the second FL node 106 interferes with the RAN node 108 at the first frequency.

Figure 12:
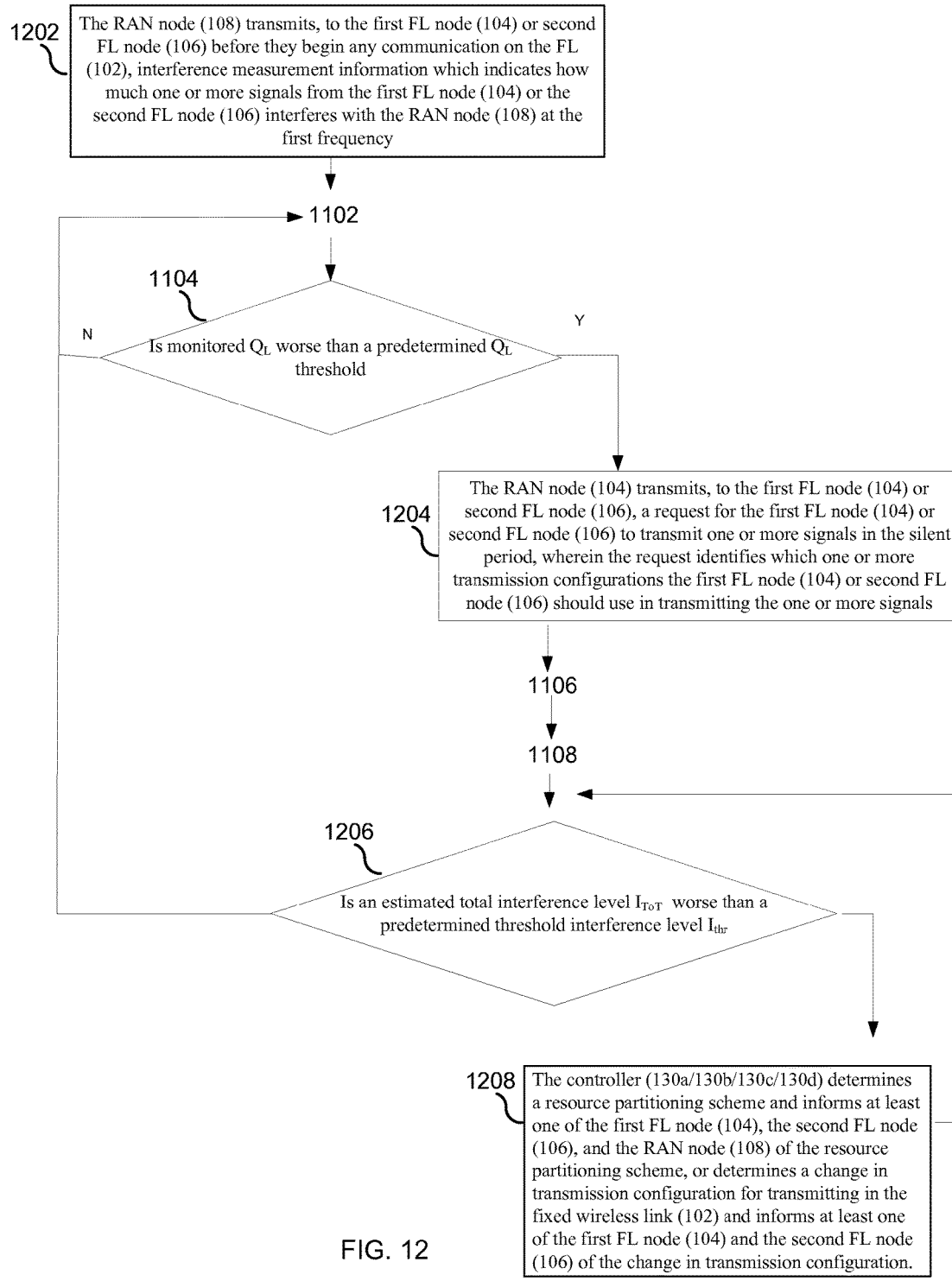

In step 1108, the RAN node 108 may provide interference measurement information to a controller (130a/130b/130c/130d/130e) configured to manage interference mitigation, wherein the interference measurement information indicates how much the one or more signals from the first FL node (104) or second FL node (106) interferes with the RAN node (108) at the first frequency, and the controller is configured to manage interference mitigation between the first FL node (104) or second FL node (106) and the RAN node (108) based on the interference measurement information FIG. 12 illustrates additional steps that may be performed. In step 1202, the RAN node 108 may transmit, to the first FL node 104 or second FL node 106, interference measurement information which indicates how much one or more signals from the first FL node 104 or the second FL node 106 interferes with the RAN node 108 at the first frequency $f_1$. This may be part of a start-up phase in which the fixed wireless link determines which transmission configurations (e.g., beam width or transmit power) interferes with the RAN node 108, and avoids using those transmission configurations. This start-up phase may use the more general transmission configuration, rather than beamforming configuration, because the beam direction for the fixed wireless link transmission may be fixed, and other aspects of the transmission configuration may need to be varied to reduce interference. Step 1202 may be performed in a start-up phase that occurs before the first FL node (104) and the second FL node (106) begin any communication on the fixed wireless link (102).

In step 1204, the RAN node transmits, to the first FL node 104 or second FL node 106, a request for the first FL node 104 or second FL node 106 to transmit one or more signals in the silent period, wherein the request identifies which one or more transmission configurations the first FL node 104 or second FL node 106 should use in transmitting the one or more signals.

In step 1206, the interference mitigation controller (130a/130b/130c/130d/130e) may determine whether an estimated total interference $I_{ToT}$ from the fixed wireless link 102 is worse than a predetermined threshold interference level $I_{thr}$. In response to determining that this is the case, the controller determines a resource partitioning scheme and informs at least one of the first FL node (104), the second FL node (106), and the RAN node (108) of the resource partitioning scheme, or determines a change in transmission configuration for transmitting in the fixed wireless link (102) and informs at least one of the first FL node (104) and the second FL node (106) of the change in transmission configuration.

If $I_{ToT}$ is not worse than $I_{thr}$, the RAN node 108 may return to step 1102, or it may perform interference measurement on another node (e.g., a nearby RAN node, such as RAN node 112) during a subsequent silent period.

Figure 13:
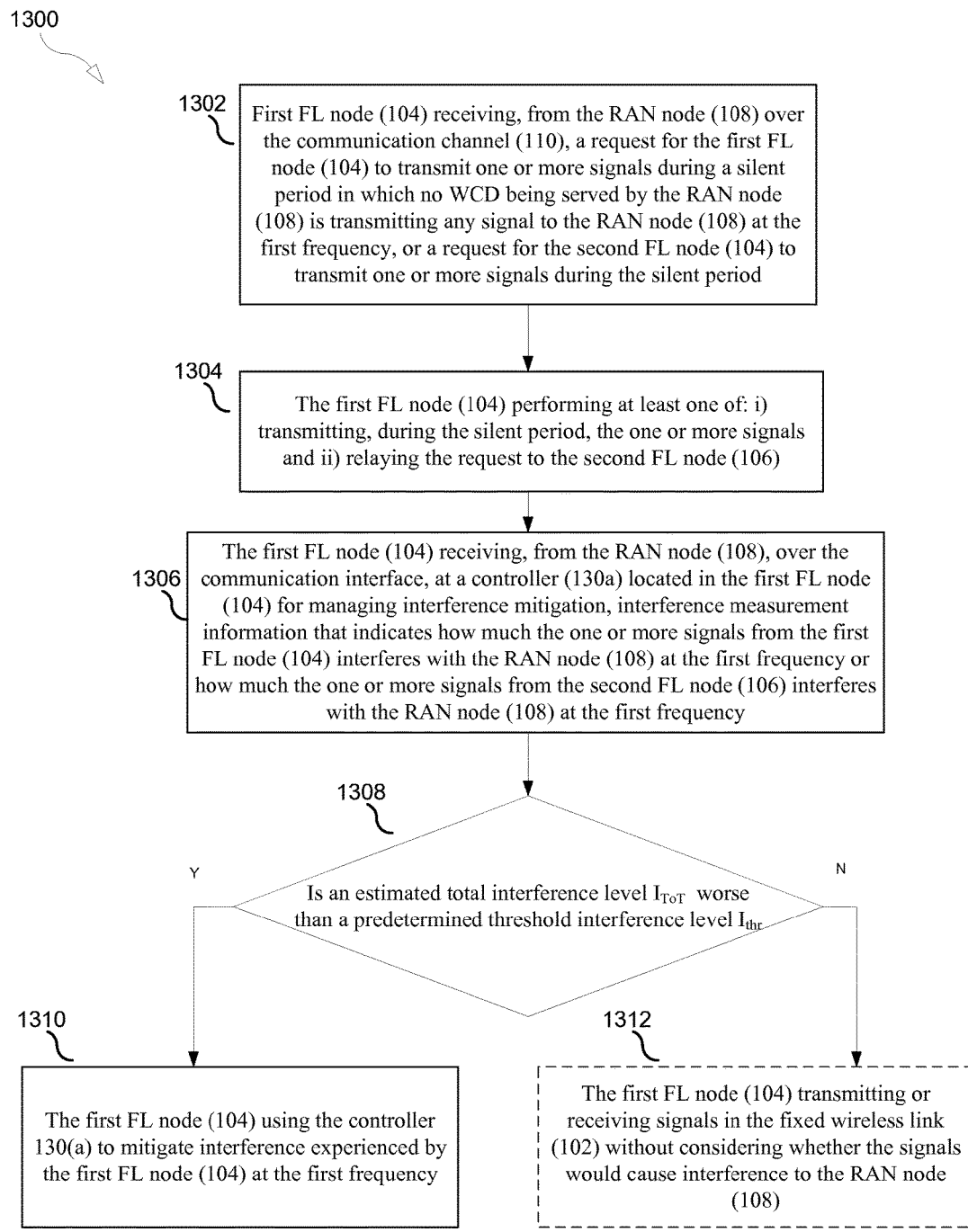

Interference Measurement for the RAN Node from the Perspective of the Fixed Wireless Link The steps in FIGS. 11 and 12 illustrate interference management for the RAN node, from the perspective of the RAN node. FIG. 13 illustrates interference management for the RAN node from the perspective of the fixed wireless link (e.g., FL node 104). More specifically, FIG. 13 illustrates example steps for a method 1300 for managing interference between i) a fixed wireless link (FL) 102 formed by a first FL node 104 and a second FL node 106 which are configured to communicate wirelessly with each other at a first frequency and ii) a radio access network (RAN) node 108 serving wireless communication devices (WCDs) and communicatively coupled to at least the first FL node 104 through a communication channel (110).

In an embodiment, method 1300 begins at step 1302, in which First FL node 104 receives, from the RAN node 108 over the communication channel 110, a request for the first FL node 104 to transmit one or more signals during a silent period in which no WCD being served by the RAN node 108 is transmitting any signal to the RAN node 108 at the first frequency, or a request for the second FL node 104 to transmit one or more signals during the silent period.

If the request is for the second FL node 106 to transmit one or more signals, the first FL node 104 may convey that request to the second FL node 106. Thus, in step 1304, the first FL node 104 performs at least one of: i) transmitting, during the silent period, the one or more signals and ii) relaying the request to the second FL node 106.

In step 1306, the first FL node 104 receives, from the RAN node 108 over the communication interface, at a controller (130a) located in the first FL node (104) for managing interference mitigation, interference measurement information that indicates how much the one or more signals from the first FL node 104 interferes with the RAN node 108 at the first frequency or how much the one or more signals from the second FL node 106 interferes with the RAN node 108 at the first frequency.

In step 1308, the first FL node 104 uses the controller (130a) to determine, based on the interference measurement information, whether an estimated total interference level $I_{ToT}$ is worse than a predetermined threshold interference level $I_{thr}$.

In step 1310, in response to determining that $I_{ToT}$ is worse than $I_{thr}$, the first FL node 104 uses the controller to mitigate interference at the RAN node 108. In step 1312, if $I_{ToT}$ is not worse than $I_{thr}$, the first FL node 104 may transmit or receive signals in the fixed wireless link 102 without considering whether the signals would cause interference to the RAN node 108. Additional details for the above steps in FIGS. 11-13 may adopt the principles discussed with respect to FIGS. 1-10.

WCD as the Aggressor Node

The above discussion focuses on a RAN node serving one or more WCDs as a node which experiences or causes interference. In some cases, however, a WCD may also be the aggressor node which causes interference for a fixed wireless link node. The principles discussed above may be applied to this situation as well. For instance, this situation may involve a method for managing interference between i) a fixed wireless link (FL) 102 formed by at least a first FL node 104 and a second FL node 106 which are configured to communicate wirelessly with each other at a first frequency and ii) a wireless communication device, WCD 118, being served by a radio access network (RAN) node 108 communicatively coupled to at least the first FL node 104 through a communication channel 110.

In an embodiment, the method may comprise: a) the first FL node (104) monitoring radio link quality, $Q_L$, of fixed wireless link signals received by the first FL node (104) at the first frequency and b) the first FL node (104) determining whether $Q_L$ is worse than a predetermined radio link quality threshold.

In response to determining that $Q_L$ is worse than the predetermined radio link quality threshold: c) the first FL node (104) may, during a silent period in which the second FL node (106) is not transmitting any signal to the first FL node (104) at the first frequency, how much one or more signals transmitted from the WCD (118) interferes with the first FL node (104) at the first frequency.

Subsequently, in step d), the first FL node (104) may transmit, to a controller (e.g., controller 130b in the RAN node (108)), interference measurement information which indicates how much the one or more signals from the WCD (118) interferes with the first FL node (104) at the first frequency.

The controller may manage interference mitigation between the WCD and the first FL node (104) based on the interference measurement information. For example, it may determine a resource partitioning scheme, as discussed above, or may change a transmission configuration by which the WCD transmits signals to the RAN node (108). It may then inform at least one of the WCD and the first FL node (104) of the interference mitigation scheme. For instance, the RAN node 108 may instruct the WCD to stop using certain beamforming configurations for UL transmissions.

This method may also include, for example, a coordinating step in which the first FL node (104) transmits a request to the RAN node (108), which identifies which interference mitigation techniques, e.g., which one or more beamforming configurations, that the WCD (118) should use in transmitting the one or more signals during the silent period.

Based on the interference measurement information, either one or both of the fixed wireless link and the WCD may take steps to reduce mitigation, such as by restricting which beamforming configurations are used by the WCD, or by resource partitioning.

Exemplary Fixed Wireless Link Node

Figure 14:
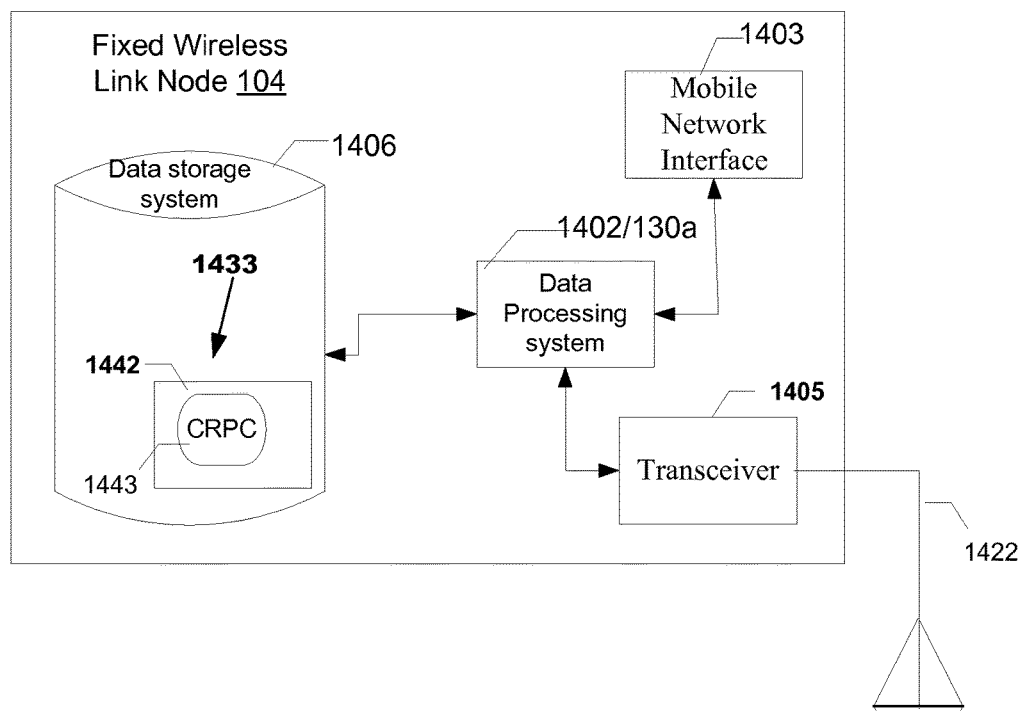
FIG. 14 illustrates an example fixed wireless link node according to an aspect of the present disclosure.

FIG. 14 illustrates a block diagram of a fixed wireless node 104 and node controller 1402 according to some embodiments. As shown in FIG. 14, FL node 104 may include: a controller 1402 that takes the form of a data processing system 1402, which may include one or more processors (e.g., microprocessors and/or one or more circuits, such as an application specific integrated circuit (ASIC), Field-programmable gate arrays (FPGAs), etc.); a transceiver 1405 and antenna 1422 for receiving message from, and transmitting messages to, another apparatus such as the WCD; a data storage system 1406, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1402 includes a processor (e.g., a microprocessor), a computer program product 1433 may be provided, which computer program product includes: computer readable program code 1443 (e.g., instructions), which implements a computer program, stored on a computer readable medium 1442 of data storage system 1406, such as, but not limited, to magnetic media (e.g., a hard disk), optical media (e.g., a DVD), memory devices (e.g., random access memory), etc. In some embodiments, the controller 1402 may be the interference mitigation controller 130*a* or 130*e* depicted in FIG. 1. In some embodiments, computer readable program code 1443 is configured such that, when executed by data processing system 1402, code 1443 causes the data processing system 1402 to perform steps described herein. In some embodiments, controller 1402 may be configured to perform steps described above without the need for code 1443. For example, data processing system 1402 may consist merely of specialized hardware, such as one or more application-specific integrated circuits (ASICs). Hence, the features of the present invention described above may be implemented in hardware and/or software. The FL Node 104 may further include a mobile network interface 1403 for communicating with a RAN node 108 over communication channel 110.

Exemplary Radio Access Network (RAN) Node

Figure 15:
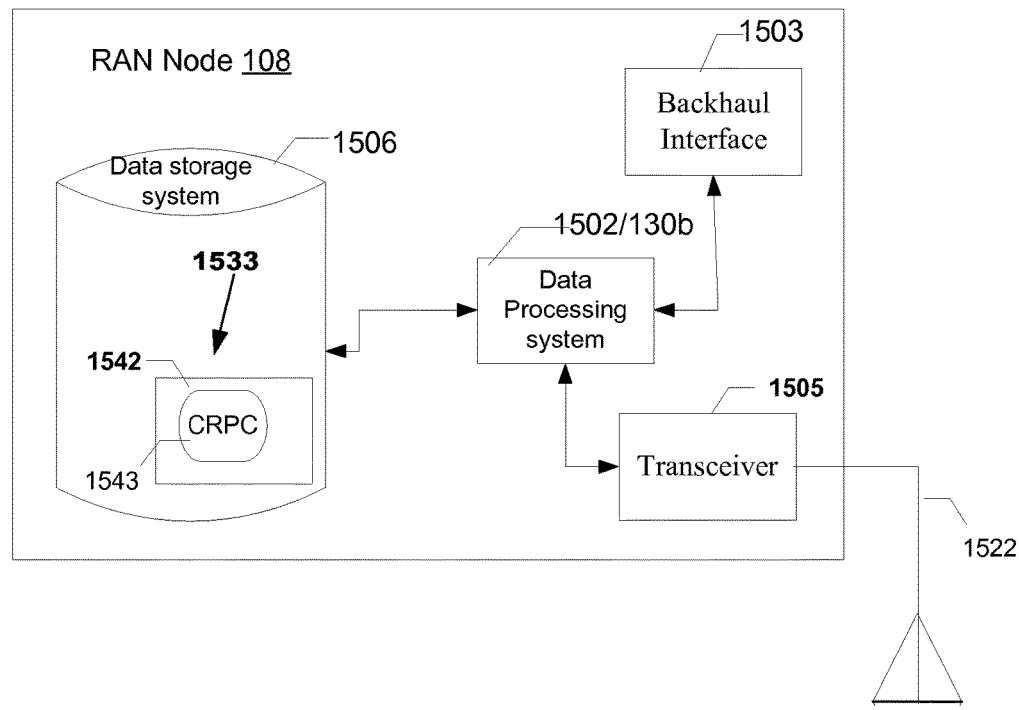
FIG. 15 illustrates an example radio access network node according to an aspect of the present disclosure.

FIG. 15 illustrates a block diagram of a RAN node 108 (e.b., a base station) according to some embodiments. As shown in FIG. 15, RAN node 108 may include: a controller 1502 that takes the form of a data processing system 1502, which may include one or more processors (e.g., microprocessors and/or one or more circuits, such as an application specific integrated circuit (ASIC), Field-programmable gate arrays (FPGAs), etc.); a transceiver 1505 and antenna 1522 for receiving message from, and transmitting messages to, another apparatus such as the WCD; a data storage system 1506, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1502 includes a processor (e.g., a microprocessor), a computer program product 1533 may be provided, which computer program product includes: computer readable program code 1543 (e.g., instructions), which implements a computer program, stored on a computer readable medium 1542 of data storage system 1506, such as, but not limited, to magnetic media (e.g., a hard disk), optical media (e.g., a DVD), memory devices (e.g., random access memory), etc. In some embodiments, the controller 1502 may be the interference mitigation controller 130*b* depicted in FIG. 1. In some embodiments, computer readable program code 1543 is configured such that, when executed by data processing system 1502, code 1543 causes the data processing system 1502 to perform steps described herein. In some embodiments, controller 1502 may be configured to perform steps described above without the need for code 1543. For example, data processing system 1502 may consist merely of specialized hardware, such as one or more application-specific integrated circuits (ASICs). Hence, the features of the present invention described above may be implemented in hardware and/or software. The RAN node 108 may further include a backhaul interface 1503 for communicating with a fixed wireless network (e.g., FL node 104) over a communication channel such as communication channel 110.

Exemplary Wireless Communication Device (WCD)

Figure 16:
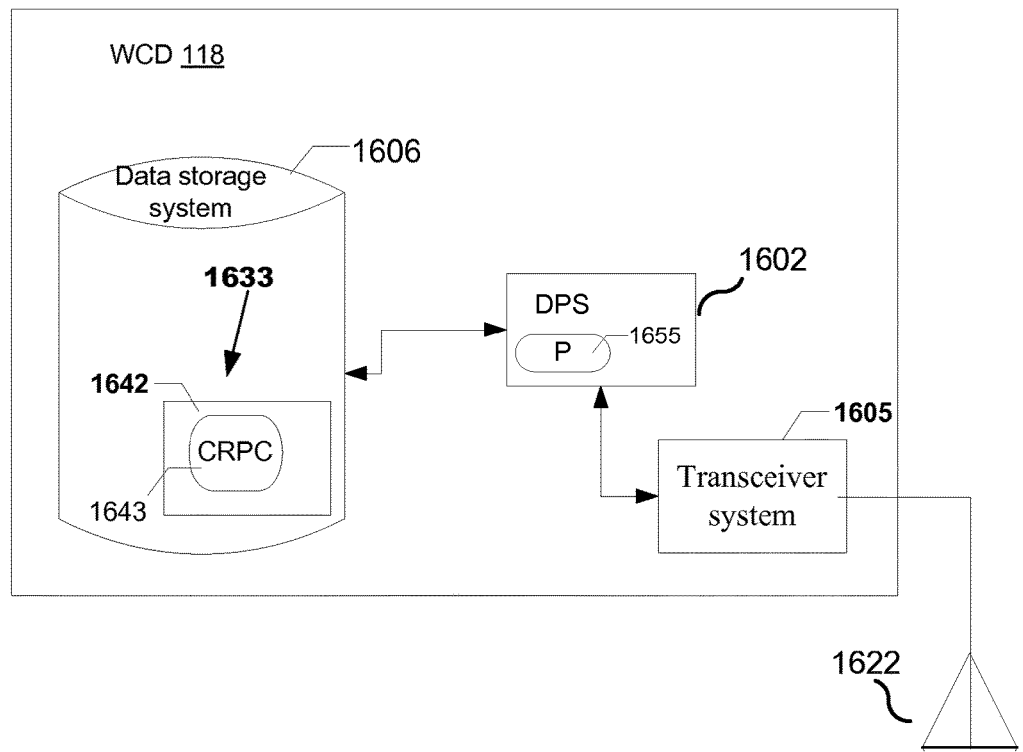
FIG. 16 illustrates an example wireless communication device according to an aspect of the present disclosure.

FIG. 16 illustrates a block diagram of an example of the WCD 118. As shown in FIG. 16, WCD 118 includes: the data processing system (DPS) 1602 (which includes, e.g., a digital signal processor (DSP), which may include one or more processors (P) 1655 (e.g., microprocessors and/or one or more circuits, such as an application specific integrated circuit (ASIC), Field-programmable gate arrays (FPGAs), etc.); a transceiver 1605, and an antenna 1622 for wirelessly transmitting and receiving information; a data storage system 1606, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 1602 includes a processor 1655 (e.g., a microprocessor), a computer program product 1633 may be provided, which computer program product includes: computer readable program code 1643 (e.g., instructions), which implements a computer program, stored on a computer readable medium 1642 of data storage system 1606, such as, but not limited, to magnetic media (e.g., a hard disk), optical media (e.g., a DVD), memory devices (e.g., random access memory), etc. In some embodiments, computer readable program code 1643 is configured such that, when executed by data processing system 1602, code 1643 causes the data processing system 1602 to perform steps described herein. In some embodiments, WCD 118 is configured to perform steps described above without the need for code 1643. For example, data processing system 1602 may consist merely of specialized hardware, such as one or more application-specific integrated circuits (ASICs). Hence, the features of the present invention described above may be implemented in hardware and/or software. For example, in some embodiments, the functional components of WCD 118 described above may be implemented by data processing system 1602 executing program code 1643, by data processing system 1602 operating independent of any computer program code 1643, or by any suitable combination of hardware and/or software.

In some instances, WCD 118 may include 1) a display screen coupled to the data processing system that enables the data processing system to display information to a user of WCD 118; 2) a speaker coupled to the data processing system that enables the data processing system to output audio to the user of WCD 118; and 3) a microphone coupled to the data processing system that enables the data processing system to receive audio from the user.

Exemplary Network-Located Interference Mitigation Controller

Figure 17:
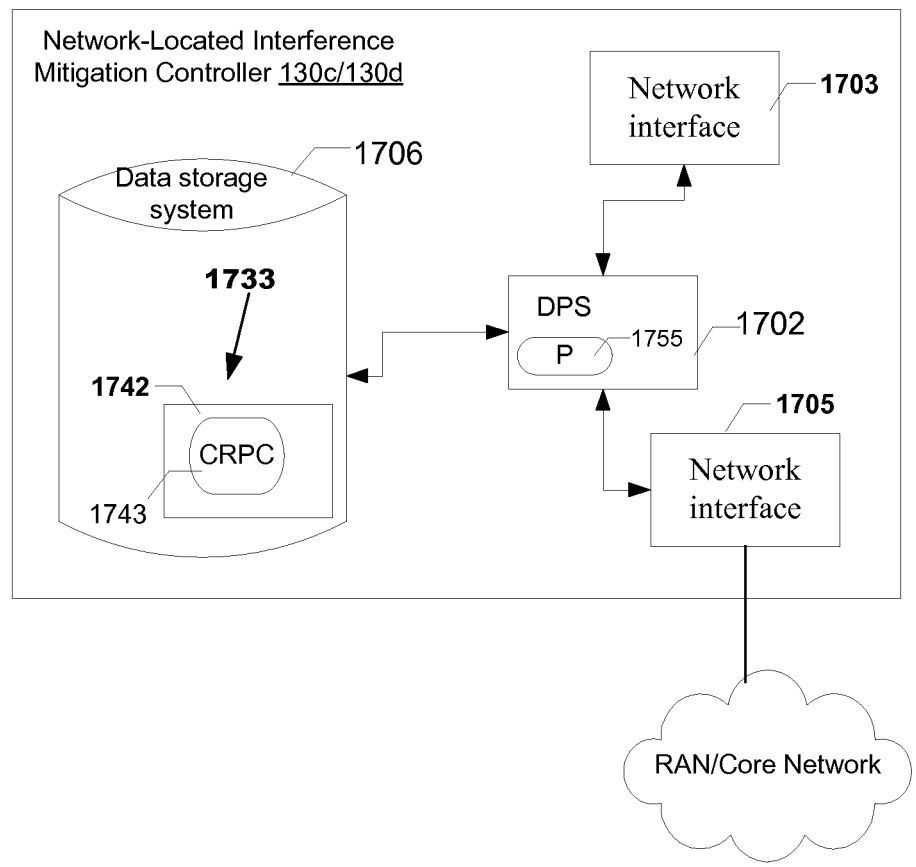
FIG. 17 illustrates an example network-located interference mitigation controller according to an aspect of the present disclosure.

FIG. 17 illustrates a block diagram of an example of network-located interference mitigation controller 130c/130d. As shown in FIG. 17, the interference mitigation controller may include: a data processing system 1702, which may include one or more processors 1755 (e.g., microprocessors and/or one or more circuits, such as an application specific integrated circuit (ASIC), Field-programmable gate arrays (FPGAs), etc.); a communication interface 1705 for communicating with the RAN (if the controller is in the core network) or with a core network (if the controller is in the cloud); a network interface 1703 for interfacing with other network components, a data storage system 1706, which may include one or more computer-readable data storage mediums, such as non-transitory data storage apparatuses (e.g., hard drive, flash memory, optical disk, etc.) and/or volatile storage apparatuses (e.g., dynamic random access memory (DRAM)). In embodiments where data processing system 1702 includes a processor (e.g., a microprocessor), a computer program product 1733 may be provided, which computer program product includes: computer readable program code 1743 (e.g., instructions), which implements a computer program, stored on a computer readable medium 1742 of data storage system 1706, such as, but not limited, to magnetic media (e.g., a hard disk), optical media (e.g., a DVD), memory devices (e.g., random access memory), etc. In some embodiments, computer readable program code 1743 is configured such that, when executed by data processing system 1702, code 1743 causes the data processing system 1702 to perform steps described herein. In some embodiments, the controller 130c/130d may be configured to perform steps described above without the need for code 1743. For example, data processing system 1702 may consist merely of specialized hardware, such as one or more application-specific integrated circuits (ASICs). Hence, the features of the present invention described above may be implemented in hardware and/or software.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A first fixed wireless link, FL, node, comprising:
one or more transceivers configured to communicate wirelessly with a second FL node using at least a first frequency so as to form a fixed wireless link, FL; and
a controller comprising one or more processing circuits configured to:
a) monitor radio link quality of signals of the fixed wireless link received by the one or more transceivers at the first frequency;
b) determine whether the monitored radio link quality is worse than a predetermined radio link quality threshold;
in response to determining that the monitored radio link quality is worse than the predetermined radio link quality threshold:
c1) transmit, to a radio access network, RAN, node over a communication channel with the RAN node, a request for the RAN node to transmit one or more signals in a silent period in which the second FL node is not transmitting any signal to the first FL node at the first frequency, the request identifying which one or more beamforming configurations the RAN node should use in transmitting the one or more signals;
c2) measure, during the silent period, how much one or more signals transmitted from the RAN node using the one or more beamforming configurations identified in the request interferes with the first FL node at the first frequency, wherein the RAN node is serving one or more wireless communication devices, WCDs; and
d) provide interference measurement information to an interference mitigation controller configured to manage interference mitigation between the fixed wireless link and the RAN node based on the interference measurement information, wherein the interference measurement information indicates how much the one or more signals from the RAN node interferes with the first FL node at the first frequency.

2. The first FL node of claim 1, wherein the different beamforming configurations correspond to at least one of: i) different beam directions, ii) different beam widths, and iii) different output powers at the RAN node, wherein the controller is configured to measure, during the silent period, each signal in a group of one or more signals from the RAN node corresponding to a group of one or more beamforming configurations which the RAN node is able to use in transmitting signals.

3. The first FL node of claim 2, wherein the group of one or more beamforming configurations includes only a subset of all beam directions in which the RAN node is capable of transmitting, wherein the controller is configured to measure, during a subsequent silent period, another group of one or more signals corresponding to a different subset of the beam directions in which the RAN node is capable of transmitting.

4. The first FL node of claim 1, wherein the interference measurement information transmitted to the RAN node includes at least one of: i) information about signal power detected at the first FL node during the silent period, and ii) an estimated total interference level, $I_{ToT}$.

5. The first FL node of claim 4, wherein the controller is configured to:
collect statistics on channel noise during a time period before the RAN node begins transmitting any signal for WCDs; and
determine a baseline level of channel noise based on the collected statistics on channel noise, wherein the estimated total interference level, $I_{ToT}$, is indicated by a difference between a maximum signal power detected at the first FL node during the silent period and the baseline level of channel noise.

6. The first FL node of claim 1, wherein the controller is the interference mitigation controller, wherein the interference mitigation controller is configured to:

determine, based on the interference measurement information, whether an estimated total interference level, $I_{ToT}$, is worse than a predetermined threshold interference level, $I_{thr}$; and in response to determining that $I_{ToT}$ is worse than $I_{thr}$, either (1) determine a resource partitioning scheme and inform at least one of the first FL node, the second FL node, and the RAN node of the resource partitioning scheme or (2) determine a change in transmission configuration for transmitting to WCDs and inform at least one of the RAN node and another RAN node of the change in the transmission configuration;

wherein the resource partitioning scheme includes at least one of (i) a time partitioning scheme in which the fixed wireless link and the RAN node use non-overlapping time slots to transmit signals at the first frequency, (ii) a frequency partitioning scheme in which the fixed wireless link and the RAN node use different frequencies to transmit signals during overlapping transmission periods, or (iii) a combination of the time partitioning scheme and the frequency partitioning scheme;

wherein the change in the transmission configuration includes at least one of (i) the another RAN node replacing the RAN node in transmitting signals to the wireless communication device, (ii) the RAN node using a different beamforming configuration than one which was determined to make $I_{ToT}$ worse than $I_{thr}$, (iii) the RAN node using a different frequency than the first frequency for future signal transmissions to a WCD, or (iv) the RAN node reducing an output power used to transmit signals to the WCD.

7. The first FL node of claim 1, wherein the controller is configured to:

determine, based on the interference measurement information, whether an estimated total interference level, $I_{ToT}$, caused by the RAN node is worse than a predetermined threshold interference level, $I_{thr}$; and in response to determining that $I_{ToT}$ is not worse than $I_{thr}$, measure how much one or more signals transmitted from another RAN node interferes with the first FL node at the first frequency, wherein the RAN node is the closest RAN node to the first FL node and the other RAN node is the second closest RAN node to the first FL node.

8. The first FL node of claim 1, wherein the controller is configured to monitor at least one of: i) signal to noise ratio, SNR, or signal to interference and noise ratio, SINR, of signals from the second FL node; ii) bit error rate, BER, or block error rate, BLER, of signals from the second FL node; and iii) transport format of signals from the second FL node, or wherein the silent period is created by at least one of: i) mutual coordination between the first FL node and the second FL node, and ii) mutual coordination between the first FL node and the RAN node.

9. A radio access network, RAN, node, comprising:

one or more transceivers configured to communicate wirelessly with wireless communication devices, WCDs, the one or more transceivers being able to use different beamforming configurations in transmitting different signals;

a communication interface configured to communicate, through a communication channel, with a first fixed wireless link, FL, node that forms a fixed wireless link with a second FL node; and a controller comprising one or more processing circuits configured to:

a1) receive, from the first FL node through the communication interface, a request to transmit one or more signals during a silent period in which the second FL node is not transmitting any signal to the first FL node at a first frequency, wherein the request identifies which one or more beamforming configurations the RAN node should use in transmitting the one or more signals, a2) transmit one or more signals through the one or more transceivers during the silent period using the one or more beamforming configurations identified in the request;

b) receive, from the first FL node through the communication interface, interference measurement information that indicates how much the one or more signals from the RAN node interferes with the first FL node at the first frequency;

c) determine, based on the interference measurement information, whether an estimated total interference level, $I_{ToT}$, is worse than a predetermined threshold interference level, $I_{thr}$; and d) in response to determining that $I_{ToT}$ is worse than $I_{thr}$, mitigate interference experienced by the first FL node at the first frequency.

10. The RAN node of claim 9, wherein the controller is configured to mitigate interference by either (i) determining a resource partitioning scheme and informing at least one of the first FL node, the second FL node, and the RAN node of the resource partitioning scheme or (ii) determining a change in transmission configuration and informing at least one of the RAN node and the other RAN node of the change in the transmission configuration;

wherein the resource partitioning scheme includes at least one of (i) a time partitioning scheme in which the fixed wireless link and the RAN node use non-overlapping time slots to transmit signals at the first frequency, (ii) a frequency partitioning scheme in which the fixed wireless link and the RAN node use different frequencies to transmit signals during overlapping transmission periods, or (iii) a combination of the time partitioning scheme and the frequency partitioning scheme;

wherein the change in the transmission configuration includes at least one of (i) the another RAN node replacing the RAN node in transmitting signals to the wireless communication device, (ii) the RAN node using a different beamforming configuration than one which was determined to make $I_{ToT}$ worse than $I_{thr}$, (iii) the RAN node using a different frequency than the first frequency for future signal transmissions to a WCD, or (iv) the RAN node reducing an output power used to transmit signals to the WCD.

11. The RAN node of claim 9, wherein the controller is configured to, at least one of:

i) transmit, during the silent period, a group of signals that correspond to all beam directions in which the RAN node is capable of transmitting; or ii) transmit, during the silent period, a group of one or more signals that correspond to only a subset of all beam directions in which the RAN node is capable of transmitting, and transmit, during a subsequent silent period, another group of one or more signals that correspond to a different subset of beam directions in which the RAN node is capable of transmitting.

12. The RAN node of claim 9, wherein the controller is configured to:
  collect statistics on channel noise during a time period before the RAN node begins transmitting any signal for WCDs; and
  determine a baseline level of channel noise based on the collected statistics on channel noise, wherein the estimated total interference level, $I_{ToT}$, is indicated by a difference between a maximum signal power received at the first FL node during the silent period and the baseline level of channel noise.

13. The RAN node of claim 9, wherein the controller is configured to:
  transmit, before the RAN node begins performing any communication with any WCD to be served by the RAN node, different signals using different beam directions;
  request, from the first FL node, interference measurement information corresponding to the different beam directions;
  determine, based on this interference measurement information, whether any of the beam directions interferes with the fixed wireless link at the first frequency by more than a threshold amount; and
  refrain from transmitting any signal to any of the WCDs in a beam direction determined to interfere with the fixed wireless link at the first frequency by more than the threshold amount.

14. A method for managing interference between i) a fixed wireless link, FL, formed by at least a first FL node and a second FL node which are configured to communicate wirelessly with each other at a first frequency and ii) a radio access network, RAN, node serving wireless communication devices, WCDs, the RAN node being able to use different beamforming configurations in transmitting different signals, and the RAN node being communicatively coupled to the first FL node through a communication channel, the method comprising:
  a) the first FL node monitoring radio link quality, $Q_L$, of fixed wireless link signals received by the first FL node at the first frequency;
  b) the first FL node determining whether $Q_L$ is worse than a predetermined radio link quality threshold;
  in response to determining that $Q_L$ is worse than the predetermined radio link quality threshold:
    c1) the first FL node transmitting, to the RAN node over the communication channel, a request for the RAN node to transmit one or more signals in a silent period in which the second FL node is not transmitting any signal to the first FL node at the first frequency, the request identifying which one or more beamforming configurations the RAN node should use in transmitting the one or more signals;
    c2) the first FL node measuring, during the silent period, how much the one or more signals transmitted from the RAN node using the one or more beamforming configurations identified in the request interferes with the first FL node at the first frequency; and
  d) the first FL node providing interference measurement information to a controller configured to manage interference mitigation, wherein the interference measurement information indicates how much the one or more signals from the RAN node interferes with the first FL node at the first frequency, and the controller is configured to manage interference mitigation between the fixed wireless link and the RAN node based on the interference measurement information.

15. The method of claim 14, wherein the different beamforming configurations correspond to at least one of: i) different beam directions, ii) different beam widths, and iii) different output powers at the RAN node, wherein step c2) comprises the first FL node measuring, during the silent period, each signal in a group of one or more signals from the RAN node corresponding to a group of one or more beamforming configurations which the RAN node is able to use in transmitting signals.

16. The method of claim 14, wherein the interference measurement information transmitted to the RAN node includes at least one of: i) information about signal power detected at the first FL node during the silent period, and ii) an estimated total interference level, $I_{ToT}$, and wherein the method further comprises:
  the first FL node collecting statistics on channel noise during a time period before the RAN node begins transmitting any signal for WCDs; and
  determining a baseline level of channel noise based on the collected statistics on channel noise, wherein the estimated total interference level, $I_{ToT}$, is indicated by a difference between a maximum signal power detected at the first FL node during the silent period and the baseline level of channel noise.

17. The method of claim 14, further comprising:
  determining, based on the interference measurement information, whether an estimated total interference level, $I_{ToT}$, is worse than a predetermined threshold interference level, $I_{thr}$; and
  in response to determining that $I_{ToT}$ is worse than $I_{thr}$, either (1) determining a resource partitioning scheme and informing at least one of the first FL node, the second FL node, and the RAN node of the resource partitioning scheme or (2) determining a change in transmission configuration for transmitting to WCDs and informing at least one of the RAN node and another RAN node of the change in the transmission configuration;
  wherein the resource partitioning scheme includes at least one of (i) a time partitioning scheme in which the fixed wireless link and the RAN node use non-overlapping time slots to transmit signals at the first frequency, (ii) a frequency partitioning scheme in which the fixed wireless link and the RAN node use different frequencies to transmit signals during overlapping transmission periods, or (iii) a combination of the time partitioning scheme and the frequency partitioning scheme;
  wherein the change in the transmission configuration includes at least one of (i) the another RAN node replacing the RAN node in transmitting signals to the wireless communication device, (ii) the RAN node using a different beamforming configuration than one which was determined to make $I_{ToT}$ worse than $I_{thr}$, (iii) the RAN node using a different frequency than the first frequency for future signal transmissions to a WCD, or (iv) the RAN node reducing an output power used to transmit signals to the WCD.

18. The method of claim 14, further comprising:
  the first FL node determining, based on the interference measurement information, whether an estimated total interference level, $I_{ToT}$, caused by the RAN node is worse than a predetermined threshold interference level, $I_{thr}$;
  in response to determining that $I_{ToT}$ is not worse than $I_{thr}$, the first FL node measuring how much one or more signals transmitted from another RAN node interferes with the first FL node at the first frequency, wherein the RAN node is the closest RAN node to the first FL node and the other RAN node is the second closest RAN node to the first FL node.

19. A method for managing interference between i) a fixed wireless link, FL, formed by at least a first FL node and a second FL node which are configured to communicate wirelessly with each other at a first frequency and ii) a radio access network, RAN, node serving wireless communication devices, WCDs, and communicatively coupled to at least the first FL node through a communication channel, the RAN node being able to use different beamforming configurations in transmitting different signals, the method comprising:
- a1) the RAN node receiving, from the first FL node over the communication channel, a request to transmit one or more signals during a silent period in which the second FL node is not transmitting any signal to the first FL node at the first frequency, wherein the request identified which one or more beamforming configurations the RAN nod should use in transmitting the one or more signals,
- a2) the RAN node transmitting the one or more signals during the silent period using one or more beamforming configurations identified in the request using the one or more beamforming configurations identified in the request;
- b) the RAN node receiving from the first FL node over the communication channel, at a controller located in the RAN node for managing interference mitigation, interference measurement information that indicates how much the one or more signals from the RAN node interferes with the first FL node at the first frequency;
- c) the RAN node using the controller to determine, based on the interference measurement information, whether an estimated total interference level, $I_{ToT}$, is worse than a predetermined threshold interference level, $I_{thr}$; and
- d) in response to determining that $I_{ToT}$ is worse than $I_{thr}$, the RAN node using the controller to mitigate interference experienced by the first FL node at the first frequency.

20. The method of claim 19, further comprising:
- the RAN node transmitting, before the RAN node begins performing any communication with any WCD to be served by the RAN node, different signals using different beam directions;
- requesting, from the first FL node, interference measurement information corresponding to the different beam directions;
- determining, based on this interference measurement information, whether any of the beam directions interferes with the fixed wireless link at the first frequency by more than a threshold amount; and
- refraining from transmitting any signal to any of the WCDs in a beam direction determined to interfere with the fixed wireless link at the first frequency by more than the threshold amount.

* * * * *